United States Patent
Stewart et al.

(10) Patent No.: US 6,725,148 B1
(45) Date of Patent: Apr. 20, 2004

(54) DIESEL ENGINE INJECTION TIMING SIGNAL INTERCEPTOR MODULE

(75) Inventors: Ted E. Stewart, Jacksonville, FL (US); Daniel J. Podnar, Boerne, TX (US)

(73) Assignee: CSXT Intellectual Properties Corporation, Jacksonville, FL (US)

( * ) Notice: Subject to any disclaimer, the term of this patent is extended or adjusted under 35 U.S.C. 154(b) by 28 days.

(21) Appl. No.: 10/285,185

(22) Filed: Oct. 31, 2002

(51) Int. Cl.[7] .............................................. F02M 51/00
(52) U.S. Cl. ...................... 701/105; 701/115; 123/480
(58) Field of Search ................. 701/105, 115, 701/102; 123/480, 478, 486

(56) References Cited

U.S. PATENT DOCUMENTS

| | | | |
|---|---|---|---|
| 4,573,347 A | | 3/1986 | Sekiguchi et al. |
| RE32,140 E | | 5/1986 | Tokuda et al. |
| 5,113,833 A | * | 5/1992 | Nagano et al. ............. 123/478 |
| 5,219,398 A | | 6/1993 | Nonaka et al. |
| 5,364,322 A | * | 11/1994 | Fukui .......................... 477/108 |
| 5,394,851 A | | 3/1995 | Cryer et al. |
| RE35,195 E | * | 4/1996 | Nagano et al. ............. 123/478 |
| 5,709,196 A | | 1/1998 | Coleman et al. |
| 5,896,845 A | | 4/1999 | Matsuda et al. |
| 6,167,870 B1 | | 1/2001 | Sakasai |
| 6,192,868 B1 | | 2/2001 | Barnes et al. |
| 6,240,896 B1 | | 6/2001 | Ueda et al. |
| 6,295,816 B1 | | 10/2001 | Gallagher et al. |
| 6,305,353 B1 | | 10/2001 | Weber et al. |

FOREIGN PATENT DOCUMENTS

JP 9-256894 * 9/1997 ........... F02D/41/34

* cited by examiner

*Primary Examiner*—Hieu T. Vo
(74) *Attorney, Agent, or Firm*—McGuireWoods LLP

(57) ABSTRACT

A diesel engine injection timing signal interceptor module comprised of a micro-controller-based control module and interface circuitry that intercepts engine speed and position signals from engine sensors and produces output signals which are shifted in time (advanced or retarded) relative to the sensor signals. By controlling the amount of time shift, the interceptor manipulates fuel injection timing. Use of the interceptor module provides the ability to reduce NOx emissions while achieving acceptable fuel consumption, without having to change the engine's sensors, electronic controller or fuel injectors.

16 Claims, 23 Drawing Sheets

| Notch | 8 | 7 | 6 | 5 | 4 | 3 | 2 | 1 | Idle |
|---|---|---|---|---|---|---|---|---|---|
| Relative Timing | 0 | 0 | 0 | 0 | 2 | 4 | 4 | 6 | 8 |
| | -2 | -2 | -2 | -2 | 0 | 2 | 2 | 4 | 4 |
| | -4 | -4 | -4 | -4 | -2 | 0 | 0 | 2 | 0 |
| | -6 | -6 | -6 | -6 | -4 | -2 | -2 | 0 | -4 |
| | -8 | -8 | -8 | -8 | -6 | -4 | -4 | -2 | -8 |
| | -10 | -10 | -10 | | -8 | -6 | -6 | -4 | |
| | | | | | -10 | -8 | -8 | -6 | |
| | | | | | | -10 | -10 | -8 | |
| | | | | | | | | -10 | |

Figure 9

CSXT #778 EMD SD70MAC Baseline w/ new injectors
Tested 2/28/02 @ SwRI

| Notch | Gross HP | obs Fuel Rate (lb/hr) | HC (g/hr) | CO (g/hr) | Corr. NOx (g/hr) | PM (g/hr) |
|---|---|---|---|---|---|---|
| 8 | 4,191 | 1,356 | 993 | 3,453 | 51,842 | 0 |
| 7 | 3,622 | 1,166 | 748 | 2,917 | 48,695 | 0 |
| 6 | 2,872 | 958 | 628 | 4,070 | 32,661 | 0 |
| 5 | 2,000 | 696 | 457 | 1,278 | 22,887 | 0 |
| 4 | 1,515 | 533 | 365 | 542 | 17,381 | 0 |
| 3 | 980 | 355 | 277 | 265 | 10,589 | 0 |
| 2 | 439 | 172 | 180 | 258 | 4,477 | 0 |
| 1 | 220 | 97 | 107 | 165 | 2,355 | 0 |
| Idle | 14 | 28 | 68 | 91 | 973 | 0 |
| DB | 20 | 132 | 153 | 246 | 2,983 | 0 |

AAR 3x3 Weighted Results

| Notch | AAR Corr. Fuel Rate (lb/hr) | AAR Corr bsfc | WF | w-BHP | obs w-Fuel w-(lb/hr) | corr w-Fuel w-(lb/hr) | w-HC w-(g/hr) | w-CO w-(g/hr) | w-NOx w-(g/hr) | w-PM w-(g/hr) |
|---|---|---|---|---|---|---|---|---|---|---|
| 8 | 1371 | 0.327 | 25.0% | 1047.9 | 339.0 | 342.8 | 248.2 | 863.3 | 12960.5 | 0.0 |
| 7 | 1180 | 0.326 | 0.0% | 0.0 | 0.0 | 0.0 | 0.0 | 0.0 | 0.0 | 0.0 |
| 6 | 970 | 0.338 | 0.0% | 0.0 | 0.0 | 0.0 | 0.0 | 0.0 | 0.0 | 0.0 |
| 5 | 705 | 0.353 | 25.0% | 499.9 | 174.0 | 176.2 | 114.2 | 319.6 | 5721.7 | 0.0 |
| 4 | 540 | 0.356 | 0.0% | 0.0 | 0.0 | 0.0 | 0.0 | 0.0 | 0.0 | 0.0 |
| 3 | 360 | 0.367 | 0.0% | 0.0 | 0.0 | 0.0 | 0.0 | 0.0 | 0.0 | 0.0 |
| 2 | 174 | 0.398 | 0.0% | 0.0 | 0.0 | 0.0 | 0.0 | 0.0 | 0.0 | 0.0 |
| 1 | 98 | 0.448 | 0.0% | 0.0 | 0.0 | 0.0 | 0.0 | 0.0 | 0.0 | 0.0 |
| Idle | 28 | 2.072 | 50.0% | 6.8 | 13.8 | 14.0 | 33.9 | 45.6 | 486.6 | 0.0 |
| DB | 134 | 6.847 | 0.0% | 0.0 | 0.0 | 0.0 | 0.0 | 0.0 | 0.0 | 0.0 |
| sum = | | | 100.0% | 1554.5 | 526.8 | 532.9 | 396.3 | 1228.5 | 19168.8 | 0.000 |
| | | | | | 0.339 obs bsfc | 0.343 corr bsfc | 0.25 | 0.79 | 12.33 | |

AAR 3x3 duty cycle weighted brake-specific emissions =>

Modal Brake-Specific Emissions

| Notch | HC (g/hp-hr) | CO (g/hp-hr) | Corr. NOx (g/hp-hr) | PM (g/hp-hr) |
|---|---|---|---|---|
| 8 | 0.24 | 0.82 | 12.37 | 0.00 |
| 7 | 0.21 | 0.81 | 13.44 | 0.00 |
| 6 | 0.22 | 1.42 | 11.37 | 0.00 |
| 5 | 0.23 | 0.64 | 11.45 | 0.00 |
| 4 | 0.24 | 0.36 | 11.48 | 0.00 |
| 3 | 0.28 | 0.27 | 10.80 | 0.00 |
| 2 | 0.41 | 0.59 | 10.21 | 0.00 |
| 1 | 0.49 | 0.75 | 10.71 | 0.00 |
| Idle | NA | NA | NA | NA |
| DB | NA | NA | NA | NA |

EPA Switcher Duty Cycle Weighted Results

| Notch | WF | w-BHP | obs w-Fuel w-(lb/hr) | corr w-Fuel w-(lb/hr) | w-HC w-(g/hr) | w-CO w-(g/hr) | w-NOx w-(g/hr) | w-PM w-(g/hr) |
|---|---|---|---|---|---|---|---|---|
| 8 | 0.8% | 33.5 | 10.8 | 11.0 | 7.9 | 27.6 | 414.7 | 0.0 |
| 7 | 0.2% | 7.2 | 2.3 | 2.4 | 1.5 | 5.8 | 97.4 | 0.0 |
| 6 | 1.5% | 43.1 | 14.4 | 14.5 | 9.4 | 61.1 | 489.9 | 0.0 |
| 5 | 3.6% | 72.0 | 25.1 | 25.4 | 16.4 | 46.0 | 823.9 | 0.0 |
| 4 | 3.6% | 54.5 | 19.2 | 19.4 | 13.1 | 19.5 | 625.7 | 0.0 |
| 3 | 5.8% | 56.9 | 20.6 | 20.9 | 16.1 | 15.4 | 614.2 | 0.0 |
| 2 | 12.3% | 53.9 | 21.2 | 21.4 | 22.1 | 31.7 | 550.6 | 0.0 |
| 1 | 12.4% | 27.3 | 12.1 | 12.2 | 13.3 | 20.5 | 292.0 | 0.0 |
| Idle | 59.8% | 8.1 | 16.5 | 16.7 | 40.5 | 54.5 | 582.0 | 0.0 |
| DB | 0.0% | 0.0 | 0.0 | 0.0 | 0.0 | 0.0 | 0.0 | 0.0 |
| sum = | 100.0% | 356.5 | 142.1 | 143.9 | 140.5 | 282.1 | 4490.4 | 0.000 |
| | | | 0.399 obs bsfc | 0.404 corr bsfc | 0.39 | 0.79 | 12.60 | |

EPA switcher duty cycle weighted brake-specific emissions =>

Fuel-Specific Emissions

| Notch | HC (g/lb fuel) | CO (g/lb fuel) | Corr. NOx (g/lb fuel) | PM (g/lb fuel) |
|---|---|---|---|---|
| 8 | 0.73 | 2.55 | 38.2 | 0.00 |
| 7 | 0.64 | 2.50 | 41.8 | 0.00 |
| 6 | 0.66 | 4.25 | 34.1 | 0.00 |
| 5 | 0.66 | 1.84 | 32.9 | 0.00 |
| 4 | 0.69 | 1.02 | 32.6 | 0.00 |
| 3 | 0.78 | 0.75 | 29.8 | 0.00 |
| 2 | 1.04 | 1.50 | 26.0 | 0.00 |
| 1 | 1.10 | 1.70 | 24.2 | 0.00 |
| Idle | 2.46 | 3.30 | 35.3 | 0.00 |
| DB | 1.16 | 1.86 | 22.6 | 0.00 |

EPA Freight Duty Cycle Weighted Results

| Notch | WF | w-BHP | obs w-Fuel w-(lb/hr) | corr w-Fuel w-(lb/hr) | w-HC w-(g/hr) | w-CO w-(g/hr) | w-NOx w-(g/hr) | w-PM w-(g/hr) |
|---|---|---|---|---|---|---|---|---|
| 8 | 16.2% | 679.0 | 219.7 | 222.1 | 160.8 | 559.4 | 8398.4 | 0.0 |
| 7 | 3.0% | 108.7 | 35.0 | 35.4 | 22.4 | 87.5 | 1460.8 | 0.0 |
| 6 | 3.9% | 112.0 | 37.4 | 37.8 | 24.5 | 158.7 | 1273.8 | 0.0 |
| 5 | 3.8% | 76.0 | 26.4 | 26.8 | 17.4 | 48.6 | 869.7 | 0.0 |
| 4 | 4.4% | 66.6 | 23.4 | 23.7 | 16.1 | 23.8 | 764.8 | 0.0 |
| 3 | 5.2% | 51.0 | 18.5 | 18.7 | 14.4 | 13.8 | 550.6 | 0.0 |
| 2 | 6.5% | 28.5 | 11.2 | 11.3 | 11.7 | 16.7 | 291.0 | 0.0 |
| 1 | 6.5% | 14.3 | 6.3 | 6.4 | 7.0 | 10.7 | 153.0 | 0.0 |
| Idle | 38.0% | 5.1 | 10.5 | 10.6 | 25.8 | 34.7 | 369.8 | 0.0 |
| DB | 12.5% | 2.4 | 16.5 | 16.7 | 19.1 | 30.8 | 372.9 | 0.0 |
| sum = | 100.0% | 1143.6 | 404.9 | 409.6 | 319.1 | 984.7 | 14504.9 | 0.000 |
| | | | 0.354 obs bsfc | 0.358 corr bsfc | 0.28 | 0.86 | 12.68 | |

EPA freight duty cycle weighted brake-specific emissions =>

Figure 10

CSXT #778 EMD SD70MAC with Interceptor Box Map @ 9.2 Target
Tested 3/1/02 @ SwRI

|       |            |          | obs Fuel Rate |         |         |         |            |         | AAR Corr |         |         |
|-------|------------|----------|---------------|---------|---------|---------|------------|---------|----------|---------|---------|
| Notch | Rel.Timing | Gross HP | (lb/hr)       | HC (g/hr) | CO (g/hr) | Corr. NOx (g/hr) | PM (g/hr) | | bsfc | Fuel Rate (lb/hr) | |
| 8 | -5 | 4,211 | 1,398 | 1,002 | 4,276 | 35,097 | 0 | | 0.333 | 1403 | |
| 7 | -6 | 3,640 | 1,208 | 818 | 4,154 | 30,992 | 0 | | 0.333 | 1212 | |
| 6 | -6 | 2,884 | 988 | 631 | 4,882 | 22,095 | 0 | | 0.344 | 992 | |
| 5 | 0 | 1,987 | 697 | 518 | 1,772 | 21,760 | 0 | | 0.353 | 701 | |
| 4 | -3 | 1,515 | 546 | 411 | 1,169 | 13,317 | 0 | | 0.362 | 549 | |
| 3 | -0.75 | 982 | 357 | 289 | 303 | 9,839 | 0 | | 0.365 | 358 | |
| 2 | -6 | 439 | 176 | 169 | 269 | 3,093 | 0 | | 0.403 | 177 | |
| 1 | -6 | 219 | 98 | 94 | 159 | 1,870 | 0 | | 0.448 | 98 | |
| Idle | -6 | 13 | 26 | 61 | 127 | 684 | 0 | | 1.929 | 26 | |
| DB | -6 | 19 | 133 | 147 | 271 | 2,475 | 0 | | 6.936 | 134 | |
| | | | | | | | sum = | | | | |

AAR 3x3 Weighted Results

| | | | obs w-Fuel | corr w-Fuel | w-HC | w-CO | w-NOx | w-PM |
|---|---|---|---|---|---|---|---|---|
| WF | w-BHP | | w-(lb/hr) | w-(lb/hr) | w-(g/hr) | w-(g/hr) | w-(g/hr) | w-(g/hr) |
| 25.0% | 1052.7 | | 349.5 | 350.9 | 250.4 | 1069.0 | 8774.2 | 0.0 |
| 0.0% | 0.0 | | 0.0 | 0.0 | 0.0 | 0.0 | 0.0 | 0.0 |
| 0.0% | 0.0 | | 0.0 | 0.0 | 0.0 | 0.0 | 0.0 | 0.0 |
| 25.0% | 496.8 | | 174.3 | 175.1 | 129.4 | 442.9 | 5440.0 | 0.0 |
| 0.0% | 0.0 | | 0.0 | 0.0 | 0.0 | 0.0 | 0.0 | 0.0 |
| 0.0% | 0.0 | | 0.0 | 0.0 | 0.0 | 0.0 | 0.0 | 0.0 |
| 0.0% | 0.0 | | 0.0 | 0.0 | 0.0 | 0.0 | 0.0 | 0.0 |
| 0.0% | 0.0 | | 0.0 | 0.0 | 0.0 | 0.0 | 0.0 | 0.0 |
| 50.0% | 6.7 | | 12.9 | 12.9 | 30.6 | 63.4 | 342.1 | 0.0 |
| 0.0% | 0.0 | | 0.0 | 0.0 | 0.0 | 0.0 | 0.0 | 0.0 |
| 100.0% | 1556.2 | | 536.7 | 538.9 | 410.4 | 1575.3 | 14556.2 | 0.0 |
| | | | 0.345 obs bsfc | 0.346 corr bsfc | 0.26 | 1.01 | 9.35 | 0.000 |

AAR 3x3 duty cycle weighted brake-specific emissions =>

Modal Brake-Specific Emissions

| Notch | HC (g/hp-hr) | CO (g/hp-hr) | Corr. NOx (g/hp-hr) | PM (g/hp-hr) |
|---|---|---|---|---|
| 8 | 0.24 | 1.02 | 8.33 | 0.00 |
| 7 | 0.22 | 1.14 | 8.51 | 0.00 |
| 6 | 0.22 | 1.69 | 7.66 | 0.00 |
| 5 | 0.26 | 0.89 | 10.95 | 0.00 |
| 4 | 0.27 | 0.77 | 8.79 | 0.00 |
| 3 | 0.29 | 0.31 | 10.02 | 0.00 |
| 2 | 0.39 | 0.61 | 7.05 | 0.00 |
| 1 | 0.43 | 0.73 | 8.54 | 0.00 |
| Idle | NA | NA | NA | NA |
| DB | NA | NA | NA | NA |

EPA switcher duty cycle weighted brake-specific emissions =>

EPA Switcher Duty Cycle Weighted Results

| Notch | WF | w-BHP | obs w-Fuel w-(lb/hr) | corr w-Fuel w-(lb/hr) | w-HC w-(g/hr) | w-CO w-(g/hr) | w-NOx w-(g/hr) | w-PM w-(g/hr) |
|---|---|---|---|---|---|---|---|---|
| 8 | 0.8% | 33.7 | 11.2 | 11.2 | 8.0 | 34.2 | 280.8 | 0.0 |
| 7 | 0.2% | 7.3 | 2.4 | 2.4 | 1.6 | 8.3 | 62.0 | 0.0 |
| 6 | 1.5% | 43.3 | 14.8 | 14.9 | 9.5 | 73.2 | 331.4 | 0.0 |
| 5 | 3.6% | 71.5 | 25.1 | 25.2 | 18.6 | 63.8 | 783.4 | 0.0 |
| 4 | 3.6% | 54.5 | 19.7 | 19.7 | 14.8 | 42.1 | 479.4 | 0.0 |
| 3 | 5.8% | 56.9 | 20.7 | 20.8 | 16.8 | 17.6 | 570.7 | 0.0 |
| 2 | 12.3% | 53.9 | 21.6 | 21.7 | 20.8 | 33.1 | 380.4 | 0.0 |
| 1 | 12.4% | 27.1 | 12.1 | 12.2 | 11.7 | 19.7 | 231.9 | 0.0 |
| Idle | 59.8% | 8.0 | 15.4 | 15.5 | 36.6 | 75.8 | 409.1 | 0.0 |
| DB | 0.0% | 0.0 | 0.0 | 0.0 | 0.0 | 0.0 | 0.0 | 0.0 |
| sum = | 100.0% | 356.3 | 143.1 | 143.6 | 138.4 | 367.8 | 3529.0 | 0.0 |
| | | | 0.401 obs bsfc | 0.403 corr bsfc | 0.39 | 1.03 | 9.90 | 0.000 |

Fuel-Specific Emissions

| Notch | HC (g/lb fuel) | CO (g/lb fuel) | Corr. NOx (g/lb fuel) | PM (g/lb fuel) |
|---|---|---|---|---|
| 8 | 0.72 | 3.06 | 25.1 | 0.00 |
| 7 | 0.68 | 3.44 | 25.7 | 0.00 |
| 6 | 0.64 | 4.94 | 22.4 | 0.00 |
| 5 | 0.74 | 2.54 | 31.2 | 0.00 |
| 4 | 0.75 | 2.14 | 24.4 | 0.00 |
| 3 | 0.81 | 0.85 | 27.6 | 0.00 |
| 2 | 0.96 | 1.53 | 17.6 | 0.00 |
| 1 | 0.96 | 1.63 | 19.1 | 0.00 |
| Idle | 2.37 | 4.91 | 26.5 | 0.00 |
| DB | 1.11 | 2.03 | 18.6 | 0.00 |

EPA freight duty cycle weighted brake-specific emissions =>

EPA Freight Duty Cycle Weighted Results

| Notch | WF | w-BHP | obs w-Fuel w-(lb/hr) | corr w-Fuel w-(lb/hr) | w-HC w-(g/hr) | w-CO w-(g/hr) | w-NOx w-(g/hr) | w-PM w-(g/hr) |
|---|---|---|---|---|---|---|---|---|
| 8 | 16.2% | 682.1 | 226.5 | 227.4 | 162.3 | 692.7 | 5685.6 | 0.0 |
| 7 | 3.0% | 109.2 | 36.2 | 36.4 | 24.5 | 124.6 | 929.8 | 0.0 |
| 6 | 3.9% | 112.5 | 38.5 | 38.7 | 24.6 | 190.4 | 861.7 | 0.0 |
| 5 | 3.8% | 75.5 | 26.5 | 26.6 | 19.7 | 67.3 | 826.9 | 0.0 |
| 4 | 4.4% | 66.7 | 24.0 | 24.1 | 18.1 | 51.4 | 585.9 | 0.0 |
| 3 | 5.2% | 51.0 | 18.6 | 18.6 | 15.0 | 15.8 | 511.6 | 0.0 |
| 2 | 6.5% | 28.5 | 11.4 | 11.5 | 11.0 | 17.5 | 201.0 | 0.0 |
| 1 | 6.5% | 14.2 | 6.4 | 6.4 | 6.1 | 10.3 | 121.6 | 0.0 |
| Idle | 38.0% | 5.1 | 9.8 | 9.8 | 23.3 | 48.2 | 260.0 | 0.0 |
| DB | 12.5% | 2.4 | 16.7 | 16.7 | 18.4 | 33.9 | 309.4 | 0.0 |
| sum = | 100.0% | 1147.3 | 414.6 | 416.2 | 323.0 | 1252.1 | 10293.5 | 0.0 |
| | | | 0.361 obs bsfc | 0.363 corr bsfc | 0.28 | 1.09 | 8.97 | 0.000 |

Figure 11

DIESEL ENGINE INJECTION TIMING SIGNAL INTERCEPTOR MODULE

FIELD OF THE INVENTION

This invention relates generally to diesel engines and, more particularly, to a method and system for altering actual fuel injection timing relative to conventional fuel injection timing set by an engine manufacturer without having to change an engine's sensors, electronic controller or fuel injectors.

BACKGROUND

Diesel engine manufacturers and users, particularly railroads, face serious challenges in further reducing emissions. Emissions from diesel engines have been under increasing scrutiny in recent years and standards are becoming stricter. The 1990 Clean Air Act Amendments mandated the U.S. Environmental Protection Agency (EPA) to establish emission standards for locomotives. Diesel engine exhaust is a heterogeneous mixture which typically includes gaseous emissions such as carbon monoxide (CO), unburned hydrocarbons (HC) and oxides of nitrogen (NOx), as well as condensed phase materials (liquids and solids) which comprise so-called particulate matter (PM). While the EPA's goal is to reduce all emissions, a primary focus in recent years has been to reduce NOx, a major component of smog and acid rain.

In general, current EPA regulations set forth at 40 C.F.R. §92.8 provide a three-tier system for limiting emissions of NOx, PM, CO and total hydrocarbons (THC) as well as other compounds from locomotives. The regulations provide separate standards for line haul locomotives (i.e., locomotives used to power freight train operations over long distances) and switch locomotives (i.e., locomotives that are designed or used solely for the primary purpose of propelling railroad cars a short distance and are powered by an engine with a maximum horsepower rating of 2300 hp or less). Tier 0 standards generally apply to locomotives and engines used in locomotives manufactured on, or after, Jan. 1, 1973, and before Jan. 1, 2002; and upgraded locomotives manufactured prior to Jan. 1, 1973. Locomotives and engines used in locomotives manufactured on, or after, Jan. 1, 2002, and before Jan. 1, 2005 are subject to Tier 1 standards. Locomotives and engines used in locomotives manufactured on, or after, Jan. 1, 2005 will be subject to Tier 2 standards. Table 1, below, provides a summary of certain emission limits in grams per brake horsepower hour (g/bhp-hr).

TABLE 1

| | Tier 0 | | Tier 1 | | Tier 2 | |
|---|---|---|---|---|---|---|
| | Line haul | Switch | Line haul | Switch | Line haul | Switch |
| Nox | 9.5 | 14.0 | 7.4 | 11.0 | 5.5 | 8.1 |
| PM | 0.60 | 0.72 | 0.45 | 0.54 | 0.20 | 0.24 |
| CO | 5.0 | 8.0 | 2.2 | 2.5 | 1.5 | 2.4 |
| THC | 1.0 | 2.1 | 0.55 | 1.20 | 0.30 | 0.60 |

[g/bhp-hr]

Emission reduction methods to-date have materially compromised fuel efficiency, an undesirable side effect from both an ecological and economic standpoint. Railroads cannot afford to substantially compromise fuel efficiency. Since fuel costs make up a significant portion of the operating costs for a railroad, any substantial compromise in fuel efficiency can substantially increase overall costs. Increased fuel consumption raises costs to the railroads and their customers. Greater demand for fuel increases costs, which affects the economy and the environment as suppliers seek to meet the demand. The environment is affected directly by the increased demand for fuel and indirectly by the inevitable shift of some freight to trucks, which emit an estimated three times more pollutants per ton moved than trains.

Injection timing, which is the time during a cycle at which diesel fuel begins to enter the combustion chamber, affects both fuel economy and emissions, particularly NOx emissions. For example, retarding injection (i.e., starting injection later in the cycle) often has the effect of reducing NOx emissions at the expense of fuel economy. The retarded fuel injection timing lowers the firing pressure in the cylinders resulting in a low cycle efficiency and leading to increased fuel consumption.

Using a one-size-fits-all approach, modern diesel engines employ electronic controllers having injection timing algorithms and tables of predetermined fuel injection timing values to govern injection timing. Each manufacturer typically selects timing values to meet then-prevailing regulatory requirements and achieve the manufacturer's own performance, operating efficiency and emissions objectives. The electronic controller produces, among other signals, an injection timing signal (i.e., a signal that determines the start of fuel injection in a cylinder) based on the preset timing values and the current operating state of the engine as indicated by output from one or more sensors. Thus, at a certain RPM, an electronic controller may generate certain pre-determined injection timing signals.

A problem with a one-size-fits-all approach is that the timing values selected by a manufacturer may not meet the performance, operating efficiency and emissions objectives of users. For example, a railroad may wish to achieve a certain acceptable range of NOx emissions at a maximum attainable fuel economy within that range. While these objectives may be achieved by altering injection timing relative to factory-set injection timing, conventional diesel engines do not provide cost-effective means for accomplishing this. Additionally, manufacturers may be unwilling to produce an electronic controller tailored for the preferences of one customer, or to allow third parties to adapt the manufacturer's proprietary coding and algorithms implemented by the electronic controller.

Accordingly, it would be desirable to provide a cost-effective system and method for altering fuel injection timing in a conventional diesel engine to achieve a determined range of acceptable emissions at an acceptable level of fuel consumption that may be used with OEM sensors, electronic controllers and fuel injectors.

SUMMARY

It is therefore an object of the present invention to provide a cost-effective system and method for altering fuel injection timing in a conventional diesel engine to achieve a determined range of acceptable emissions at an acceptable level of fuel consumption within that range.

It is another object of the invention to provide an interceptor module for intercepting signals intended for an electronic controller to produce injection timing signals and altering the intercepted signals to cause the electronic controller to produce injection timing signals that result in a determined range of acceptable emissions at an acceptable level of fuel consumption within that range.

It is also another object of the invention to provide a means for altering fuel injection timing in a conventional diesel engine to achieve a determined range of acceptable emissions at an acceptable level of fuel consumption within that range for use in connection with an OEM electronic controller and OEM fuel injectors.

It is yet another object of the invention to provide a means for altering fuel injection timing in a conventional diesel engine to achieve a determined range of acceptable emissions at an acceptable level of fuel consumption within that range without causing an electronic controller to generate a fault or error code.

To achieve these objects, a system for altering injection timing is provided according to one aspect of the subject invention. The system includes an interceptor means for intercepting signals intended for the electronic controller to produce injection timing signals. The interceptor means alters the signals, such as by introducing a time shift (either advancing or retarding the signal), and transmits the altered signals to the electronic controller. The altered signals cause the electronic controller to produce an injection timing signal desired by the user.

A module for intercepting injection timing signals from one or more sensors and introducing a determined time shift is also provided according to another aspect of the present invention. The module includes a micro-controller module for introducing a time shift to the intercepted signals and an interface module for filtering the time shifted output from the micro-controller module and interfacing with the electronic controller, causing the controller to produce desired injection timing signals.

A methodology for altering injection timing is also provided according to yet another aspect of the invention. The method includes steps of determining desired injection timing signals relative to factory-set injection timing signals, intercepting signals intended for an electronic controller to produce injection timing signals based on the factory-set injection timing values, altering the intercepted signals, such as by introducing a time shift, to cause the electronic controller to produce desired injection timing signals relative to factory-set injection timing signals, and transmitting the altered signals to the electronic controller.

BRIEF DESCRIPTION OF THE DRAWINGS

The foregoing and other objects, features and advantages of the present invention are better understood with reference to the following description, appended claims, and accompanying drawings, where:

FIG. 9 is a table of relative injection timings tested for notch settings, with the relative timing values given in degrees relative to the factory set timing, a negative number representing retarded timing, a positive number representing advanced timing and zero representing original factory set timing;

FIG. 10 is a table of performance, fuel consumption and emissions values for a baseline GM EMD SD 70MAC two-stroke, sixteen-cylinder diesel engine without an interceptor module;

FIG. 11 is a table of performance, fuel consumption and emissions values for a GM EMD SD 70MAC two-stroke, sixteen-cylinder diesel engine with an interceptor module in accordance with a preferred implementation of the present invention;

DETAILED DESCRIPTION

Figure 1:
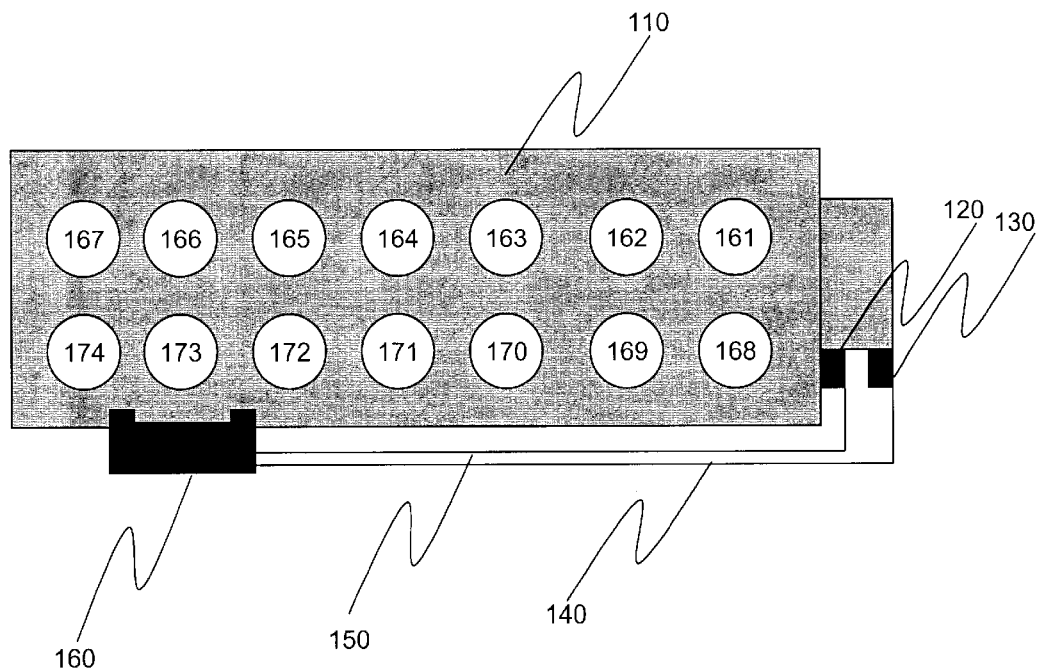
FIG. 1 conceptually depicts a top view of components of a fourteen-cylinder diesel engine with an electronic controller.

FIG. 1 conceptually depicts a top view of certain elements of a conventional locomotive diesel engine 100, such as a General Motors (GM) Electro-Motive Division (EMD) fourteen cylinder two-stroke locomotive engine, for illustrative purposes. While this embodiment of the present invention is described in the context of a two-stroke cycle diesel locomotive engine, it is recognized that the benefits of the invention accrue to four stroke diesel locomotive engines, diesel engines having a greater number of or fewer cylinders, other applications of diesel engines and spark ignition engines. In a spark ignition application, an interceptor module in accordance with the present invention can manipulate injection timing and/or ignition timing. Therefore, this embodiment of the invention is intended solely for illustrative purposes and is in no way intended to limit the scope of application of the invention.

Fourteen cylinders 161–174 are provided in the engine block 110. Each cylinder includes a fuel injector (not shown in FIG. 1) for injecting fuel.

Sensor 120 generates electrical signals representative of the position and rotational speed (rpm) of the engine's crankshaft (not shown), such as a pulse for each determined increment of crankshaft rotation. A Timing Reference Sensor (TRS), as used in GM EMD engines, is an example of such a sensor that is known in the art. Sensor 130 generates electrical signals representative of the rotational speed (rpm) of the crankshaft, such as a pulse for each complete rotation measured from a reference point on the crankshaft. A Synchronous Reference Sensor (SRS), as used in GM EMD engines, is an example of such a sensor that is known in the art. Together, the signals from sensors 120 and 130 reveal the position and rotational speed of the crankshaft and, thus, the position and speed of each piston functionally attached to the crankshaft. Such signals are referred to herein as sensor signals.

Electronic communication means 140 and 150, such as wires, are provided for communicating signals from sensors 120 and 130 to electronic controller 160. Electronic controller 160 receives sensor signals from sensor 120 (via 150) and sensor 130 (via 140). Based on received sensor signals, one or more lookup tables and algorithms, electronic controller 160 produces injection timing signals. As used herein, the term injection timing signal refers to a signal that determines the start of fuel injection. An electronic communication means (not shown), such as an engine wiring harness, communicates injection timing signals from electronic controller 160 to fuel injectors for each cylinder 161–174, activating each injector individually according to factory-set injection timing values.

Figure 2:
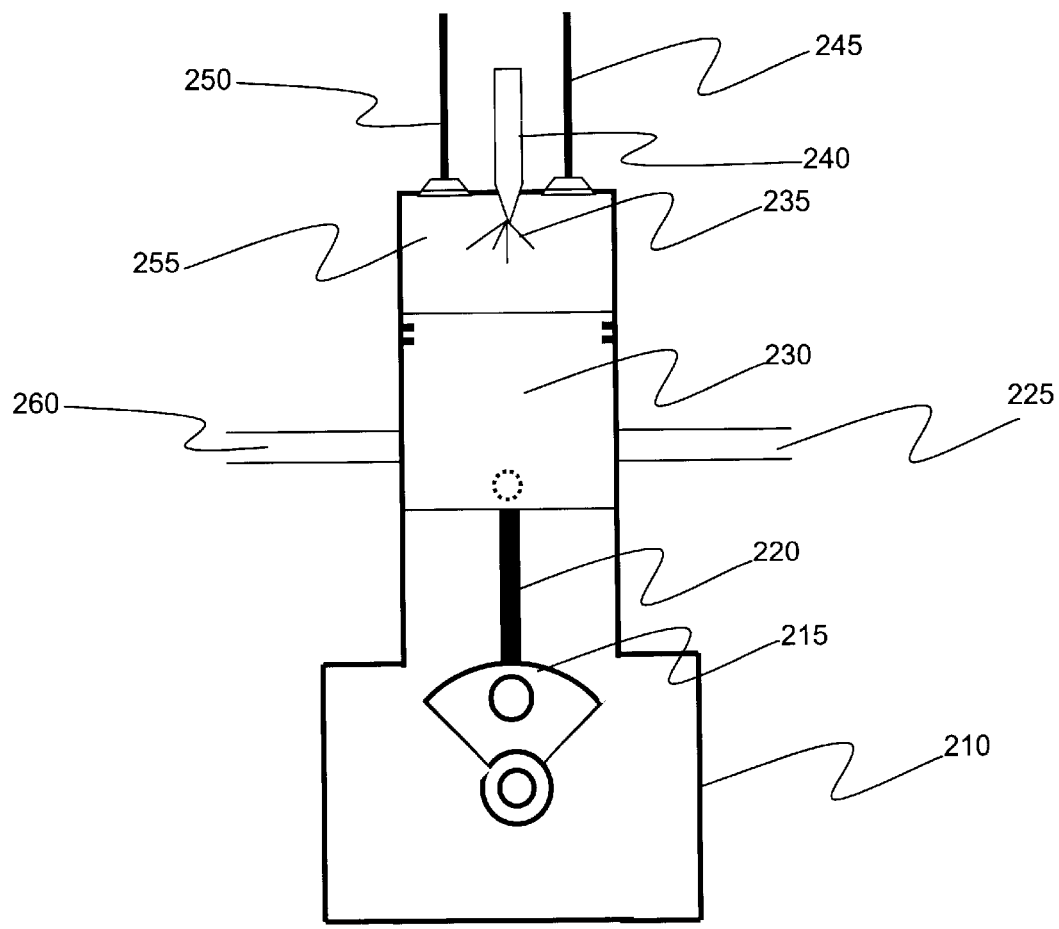
FIG. 2 conceptually depicts a cross-sectional portion of a two-stroke cycle diesel engine, such as a locomotive engine, with a piston at the top of its stroke ("top dead center")

FIG. 2 conceptually depicts a cross-sectional portion of a two-stroke cycle diesel engine such as a locomotive engine. The engine includes an engine block 210 that defines a cylinder 255. A connecting rod 220 functionally attaches piston 230, disposed in cylinder 255, to crankshaft 215. Combustion air intake ports 225 and 260, exhaust valves 250 and 245 and a fuel injector 240 communicate with cylinder 255.

Figure 3:
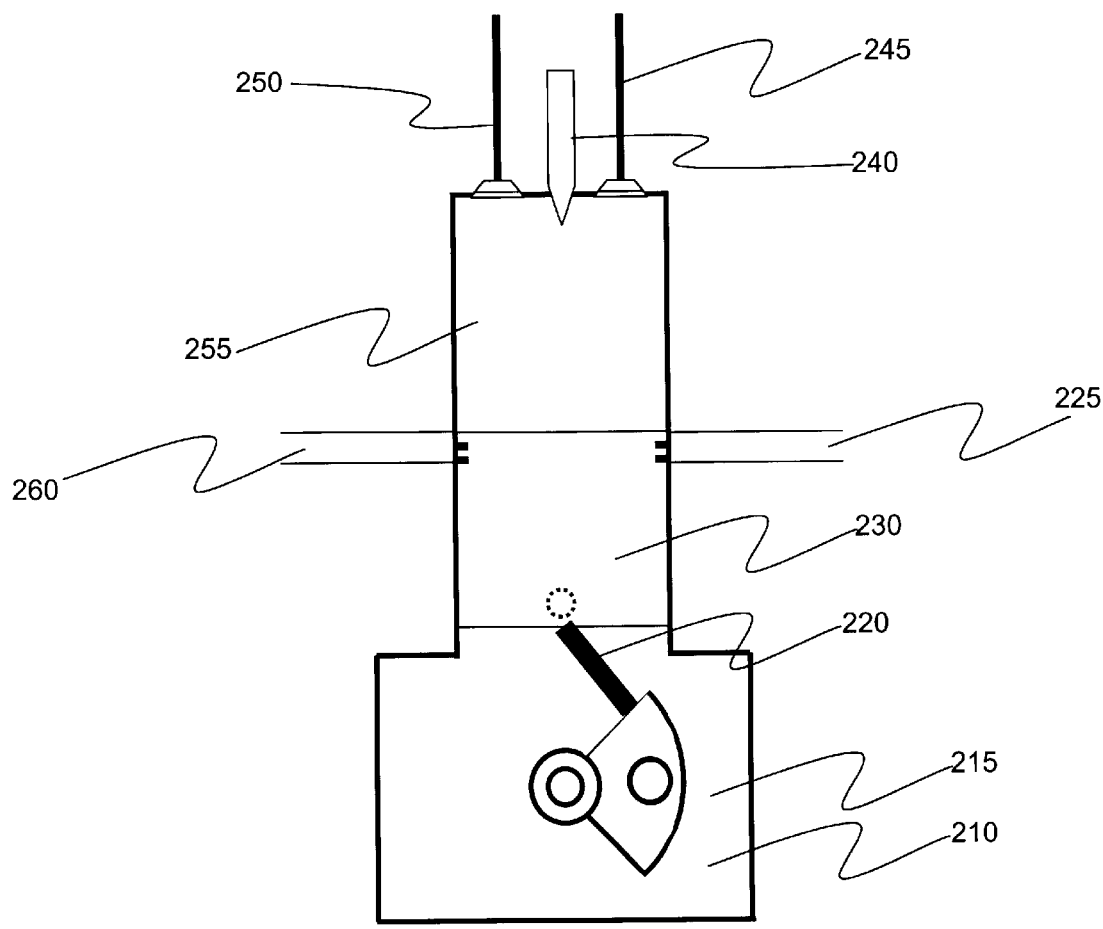
FIG. 3 conceptually depicts a cross-sectional portion of a two-stroke cycle diesel engine, such as a locomotive engine, with a piston in a power stroke at ninety degrees after top dead center.
Figure 4:
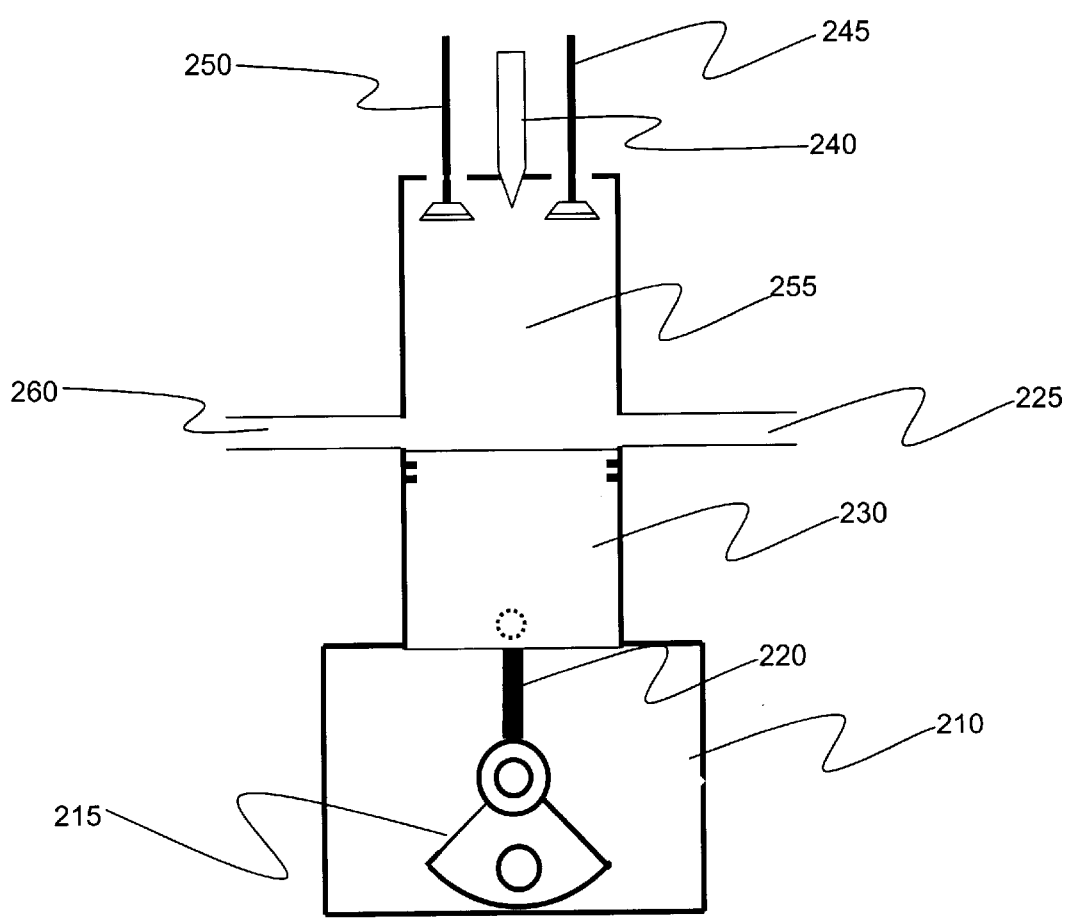
FIG. 4 conceptually depicts a cross-sectional portion of a two-stroke cycle diesel engine, such as a locomotive engine, with a piston at the bottom of a power stroke.
Figure 5:
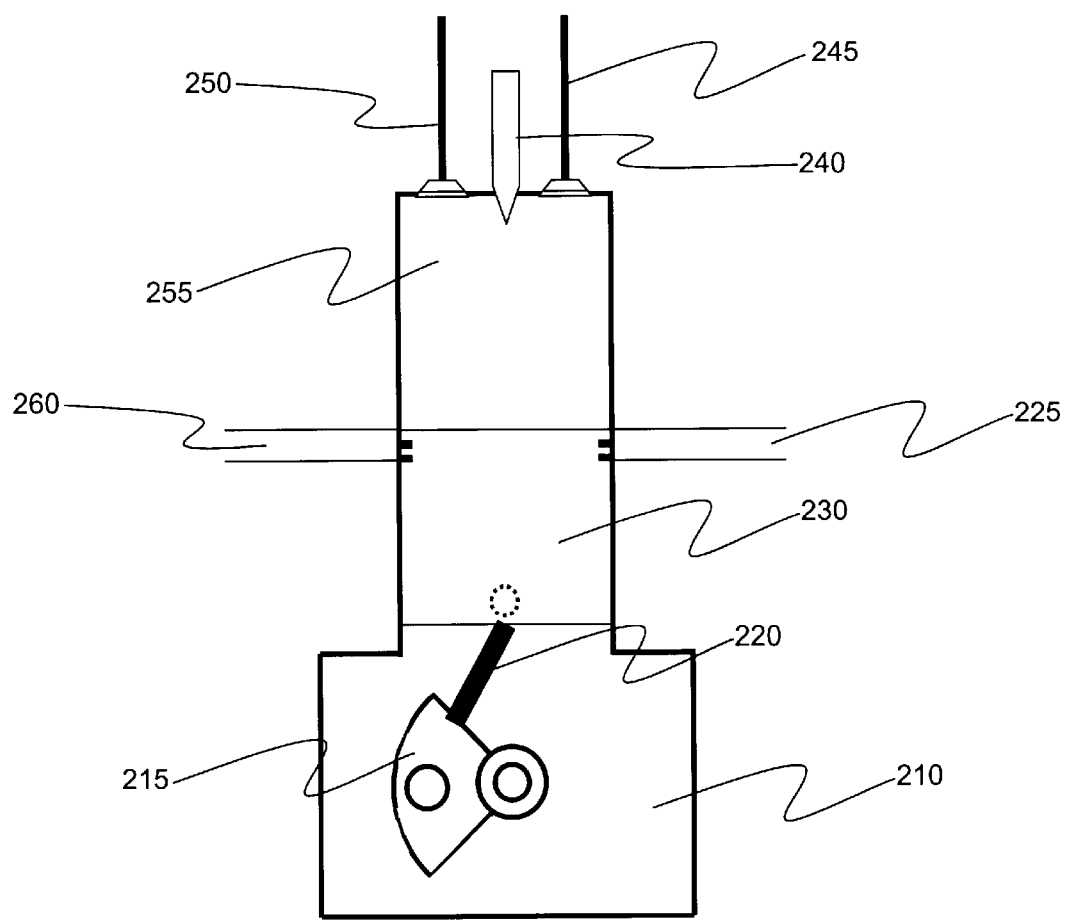
FIG. 5 conceptually depicts a cross-sectional portion of a two-stroke cycle diesel engine, such as a locomotive engine, with a piston in a compression stroke at ninety degrees before top dead center.

In operation, when piston 230 is at or near the top of its stroke (top dead center" or "TDC), cylinder 255 contains highly compressed high temperature air. At or about that time, fuel injector 240 begins to spray a liquid fuel mist 235 into cylinder 255. The injected fuel 235 rapidly ignites due to the high temperature and pressure inside cylinder 255. The pressure created by the rapid combustion of the mixture of fuel and air drives piston 230 downward. This downward traveling portion of the stroke, after top dead center, is commonly known as the power stroke. Connecting rod 220 communicates the downward motion of piston 230 to crankshaft 215, forcing crankshaft 215 to rotate, as conceptually depicted in FIG. 3. As piston 230 nears the bottom of its stroke, exhaust valves 245 and 250 open, as conceptually shown in FIG. 4, allowing products of combustion to escape and relieving pressure in cylinder 255. As piston 230 bottoms out, as also conceptually depicted in FIG. 4, air intake ports 225 and 260 are exposed, allowing fresh combustion air to enter cylinder 255 and force out remaining combustion gases. Preferably, the fresh combustion air has been pressurized using a turbocharger or supercharger (not shown) before entering cylinder 255. As piston 230 travels upward, as conceptually shown in FIG. 5, exhaust valves 245 and 250 close, air intake ports 225 and 260 are covered, and the fresh charge of combustion air is compressed. This upward traveling portion of the stroke, before top dead center is commonly known as the compression stroke. As the piston nears the top of the cylinder, the two-stroke cycle repeats.

Retarding injection timing has the effect of delaying the start of fuel injection. Advancing injection timing has the effect of starting injection earlier in the cycle. Relative injection timing, as used herein, means altered injection timing relative to original factory-set injection timing.

Typically, if advancing or retarding fuel injection timing lowers the firing pressure in the cylinders, cycle efficiency is compromised and fuel consumption increases. Thus, there is generally a tradeoff between reducing NOx emmissions by altering (e.g., retarding) injection timing and decreasing fuel efficiency.

Figure 6:
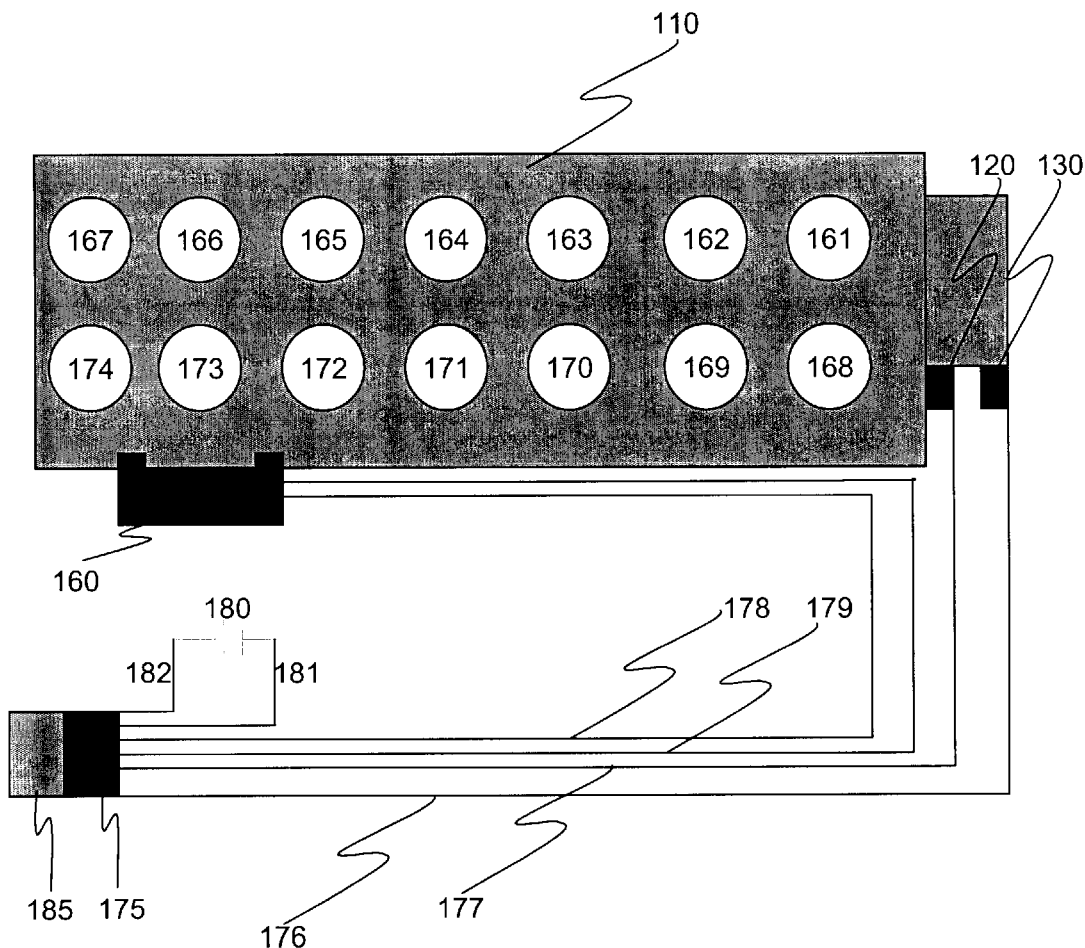
FIG. 6 conceptually depicts a top view of components of a fourteen-cylinder diesel with an electronic controller and an interceptor module in accordance with a preferred implementation of the present invention.

Referring now to FIG. 6, a top view of elements of a conventional locomotive diesel engine are shown, as in FIG. 1, except that an additional element, namely, a diesel injection timing signal interceptor module comprised of a programmed micro-controller module 175 and an interface module 185 ("interceptor module"), related electronic communication means 176–179, a power supply 180 and related electrical connection means 181 and 182, are also shown. The power supply may be a conventional 24-volt DC locomotive power supply suitable for powering an interceptor module in accordance with the present invention. Alternatively, any supply voltage between 9 and 30 volts DC could be used with the exemplary embodiment described herein. As discussed above, sensors 120 and 130 generate sensor signals that indicate the position and rotational speed (rpm) of the engine's crankshaft (not shown). However, instead of being transmitted directly to electronic controller 160, sensor signals from sensors 120 and 130 are transmitted to the interceptor module via electronic communication means 177 and 176.

The programmed micro-controller module 175 receives sensor signals and alters the signals or generates new signals to cause the electronic controller 160 to advance or retard injection timing as desired. Altered (or new) signals output from the programmed micro-controller module 175, which are referred to herein as micro-controller signals, are communicated to the interface module 185. The interface module 185 formats the micro-controller signals for use by the electronic controller 160.

Output signals from the intercept module to the electronic controller 160 are referred to herein as interface signals. They are communicated to electronic controller 160 via electronic communication means 178, 179, 140 and 150.

Electronic controller 160 produces injection timing signals based on the interface signals received from the interceptor module. While electronic controller 160 uses a preprogrammed algorithm and one or more look-up tables to determine injection timing values and produce an injection timing signal as discussed above, the input values are the interface signals from the intercept module, rather than raw sensor signals directly from sensors 120 and 130. The interface signals preferably cause electronic controller 160 to produce injection timing signals that comport with the user's objectives, rather than the manufacturer's standards.

Raw sensor signals (e.g., TRS and SRS sensor signals) are received by the micro-controller module where they are processed in a conventional manner. In a preferred implementation, the micro-controller module 175 is comprised of a micro-controller integrated circuit suitable for engine control applications, such as a C167CR-LM 16-bit single chip CMOS micro-controller from Infineon Technologies AG of München, Germany [www.infineon.com].

Figure 19:
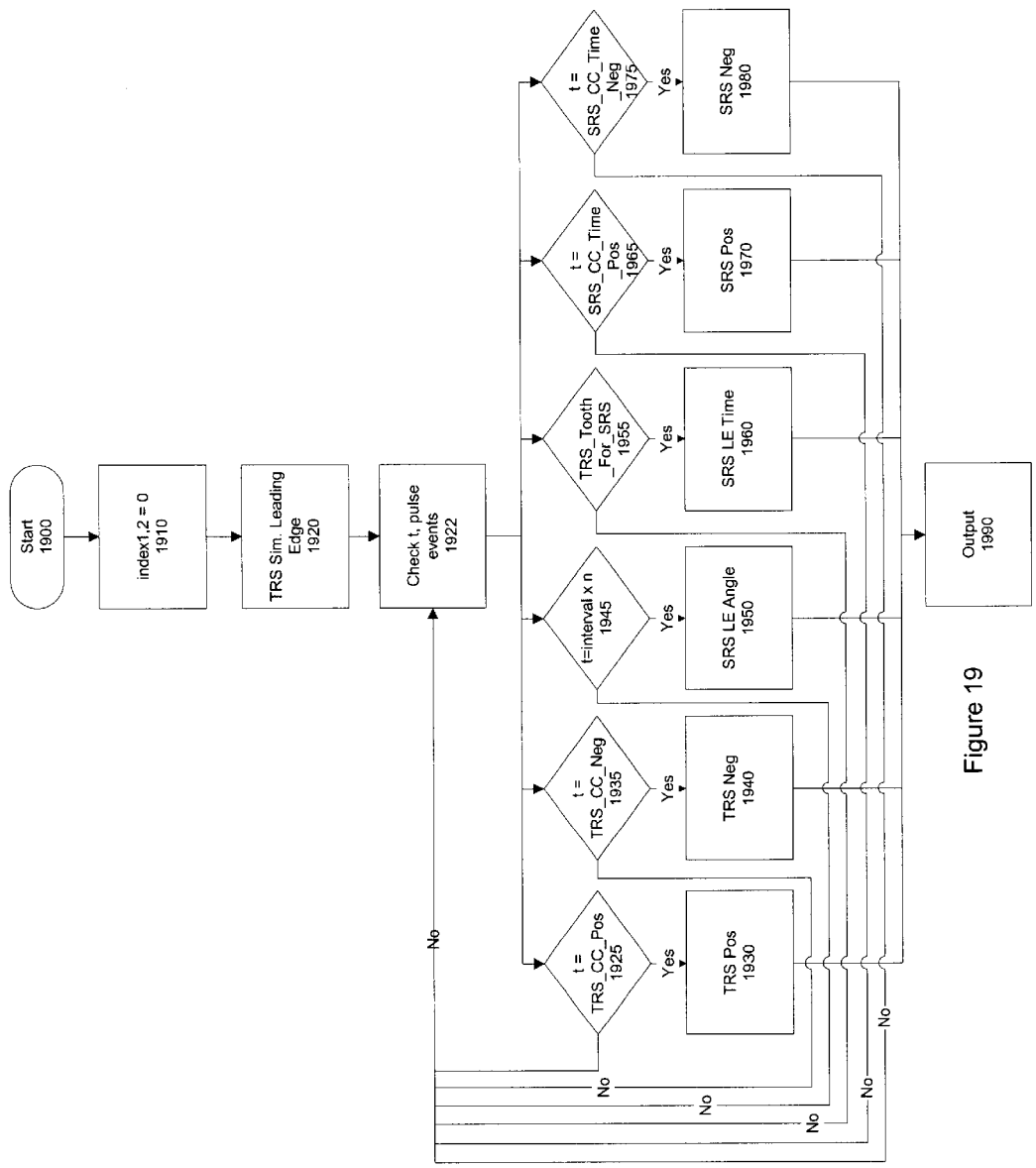
FIG. 19 is a flowchart illustrating an exemplary time shifting methodology in accordance with a preferred implementation of the present invention.

A control algorithm tailored for the micro-controller module provides a desired time shift. FIG. 19 is a flowchart for an exemplary control algorithm specifically tailored for raw TRS and SRS sensor signals, an EMDEC electronic controller, and a capture/compare unit of a C167CR-LM micro-controller. Input pulse trains from TRS and SRS sensors are fed into input capture channels. Time shift values (TimingOffset) are read from a table, based on TRS and SRS input. Output half simulated pulse trains are generated having pulses shifted in time to cause the engine's electronic controller to produce a desired injection timing signal. Those skilled in the art will appreciate that the sequence of steps is an example of a preferred methodology and could readily be modified for equivalent application with the same micro-controller or with another micro-controller suitable for injection timing control applications, with the same sensor signals or with other sensor signals indicative of engine performance and with the same electronic controller or with another electronic controller, without departing from the scope of the present invention.

Referring now to step 1910 in FIG. 19, upon power up or at zero speed, index1 and index2 are set or reset to 0. Next, TRS simulated signal leading edge time array calculations are triggered based on the falling edge of each TRS sensor input, as in step 1920. This step entails first loading Previous_Time with a time value from the falling edge of the last TRS pulse (from the micro-controller input capture channel). Next, Current_Time is loaded with a time value from the falling edge of a current TRS pulse (also from the micro-controller input capture channel). Normperiod is then computed as Current_Time minus Previous_Time. A TRS Pulse Width (TRS_PW) is then computed, as follows:

$$TRS\_PW = normperiod \times \frac{TRS\_Width\_Deg}{Deg\_Per\_Tooth}$$

where TRS_Width_Deg is the desired width of the simulated TRS output pulse in degrees (nominally 2.0 degrees), and Deg_Per_Tooth is the number of crank angle degrees between TRS teeth (typically 10.0 degrees).

A Rising Edge Time array value is then updated as follows:

$$Rising\_Edge\_Time[indx2] = Current\_Time + 2 \times normperiod - TRS\_PW - \frac{TimingOffset \times normperiod}{Deg\_Per\_Tooth}$$

where TimingOffset is the desired value of timing shift (from stock), with negative values indicating timing retard and positive values indicating timing advance from nominal.

In an exemplary implementation, TimingOffset values are computed from a lookup table as a function of engine speed. Then indx2 is incremented by 1.

When engine speed is zero, the rising edge time of the initial simulated TRS output pulse is setup by equating the TRS CC (capture/compare) Time Pos (TRS_CC_Time_Pos) value to Rising_Edge_Time [indx2]. During running conditions, TRS_CC_Time_Pos is loaded in the output edge processing routine.

TRS Positive Half Simulated (TRS Pos) signal output edge processing 1930 is triggered when the running timer matches the TRS_CC_Time_Pos value (and generates an edge on the TRS Pos signal). If the output signal edge is a rising edge transition, then the time for the falling edge of the TRS Pos signal and the rising edge of the TRS Neg Signal are setup as follows:

Increment TRS_CC_Time_Pos by TRS_PW

Set TRS_CC_Time_Neg to TRS_CC_Time_Pos

Otherwise, the time for the next rising edge of the TRS Pos signal is setup as follows:

TRS_CC_Time_Pos=Rising_Edge_Time [indx1]

Increment indx1 by 1

TRS Negative Half Simulated (TRS Neg) signal output edge processing 1940 is triggered when the running timer matches the TRS_CC_Time_Neg value (and generates an edge on the TRS Neg signal). If the output signal edge is a rising edge transition, then the time for the falling edge of the TRS Neg signal is setup as follows:

Increment TRS_CC_Time_Neg by TRS_PW

An SRS Simulated Signal Leading Edge Angle calculation 1950 is triggered based on a defined time interval (e.g., 5 msec). The TRS sensor pulse (or tooth) at which the leading edge time of the simulated SRS output should be computed is as follows:

$$TRS\_Tooth\_for\_SRS = (integer\,value)\left[\frac{SRS\_Nom\_Angle - Timing\_Offset - SRS\_Width\_Deg}{Deg\_Per\_Tooth}\right]$$

where (integer value) denotes that any value to the right of the decimal is truncated;

SRS Nom Angle is the angle at which the leading edge of the SRS pulse occurs in the stock configuration; and SRS Width Deg is the desired width of the simulated SRS output pulse in degrees (nominally 2.0 degrees).

Next, the remaining angle for the leading edge of simulated SRS pulse is calculated as follows:

SRS_Remaining_Angle=(SRS_Nom_Angle−Timing_Offset−SRS_Width_Deg)−(TRS_Tooth_for_SRS×Deg_Per_Tooth)

and $$SRS\_Pulse\_Width = normperiod \times \frac{SRS\_Width\_Deg}{Deg\_Per\_Tooth}$$

An SRS Simulated Signal Leading Edge time calculation 1960 is triggered when the "TRS_Tooth_For_SRS" TRS sensor pulse event occurs. This calculation occurs after the Current_Time value has been updated.

The SRS leading edge time is calculated as follows:

$$SRS\_CC\_Time\_Pos = \\ Current\_Time + \frac{(SRS\_Remaining\_Angle \times normperiod)}{Deg\_Per\_Tooth}$$

SRS Positive Half Simulated (SRS_Pos) Signal Output Edge processing 1970 is triggered when the running timer matches the SRS_CC_Time_Pos value (and generates an edge on the SRS_Pos_Signal). If the output signal edge is a rising edge transition, then the time for the falling edge of the SRS_Pos_Signal and the rising edge of the SRS_Neg_Signal are setup as follows:

Increment SRS_CC_Time_Pos by SRS_PW
Set SRS_CC_Time_Neg to SRS_CC_Time_Pos

SRS Negative Half Simulated (SRS Neg) Signal Output Edge processing 1980 is triggered when the running timer matches the SRS_CC_Time_Neg value (and generates an edge on the SRS_Neg signal). If the output signal edge is a rising edge transition, then the time for the falling edge of the SRS_Neg signal is setup as follows:

Increment SRS_CC_Time_Neg by SRS_PW

As apparent from the foregoing description of the methodology, simulated TRS rising edges are setup 2 TRS sensor pulses in advance to allow approximately 10 degrees timing advance or retard with respect to nominal values and still allow for normal latency times associated with the micro-controller. Those skilled in the art will appreciate that the setup may be varied to accommodate a different range of possible advance or delay.

Figure 7:
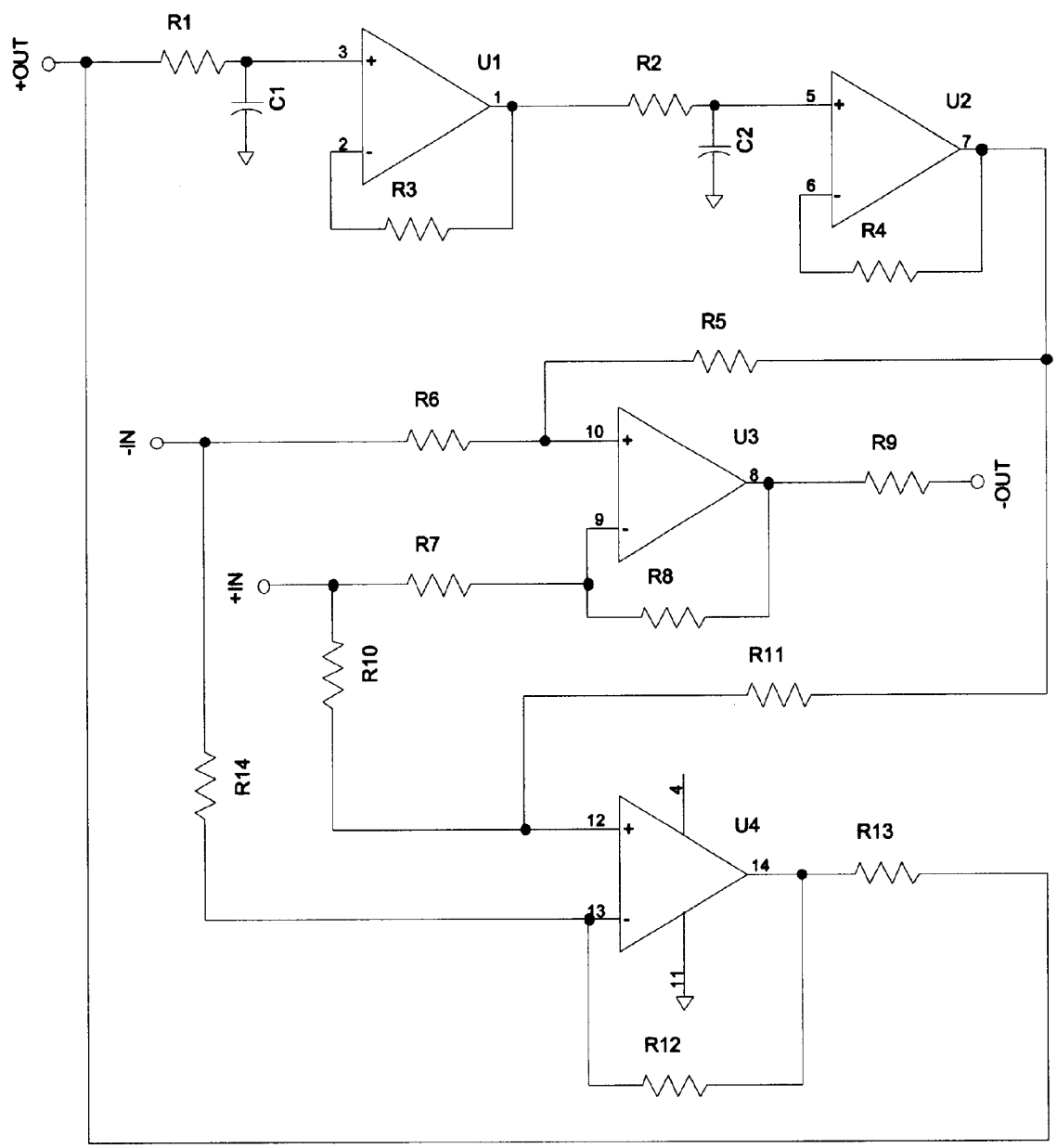
FIG. 7 is a schematic conceptually depicting an interface circuit for an interceptor module in accordance with a preferred implementation of the present invention.

Referring now to FIG. 7, a schematic diagram of an interface circuit using operational amplifiers (op amps), resistors and capacitors is provided to illustrate a preferred embodiment of an interface (differential amplifier) circuit for use in an interface module 185 of a diesel injection timing signal interceptor module in accordance with the present invention. The circuit depicted in FIG. 7 is but one example of a cost-effective, low-pass, long-time constant, active filter for interfacing with the engine's electronic controller. Other interface circuits may be used instead of the circuit depicted in FIG. 7 to achieve the same or substantially similar effect without departing from the scope of the present invention. This embodiment of an interface circuit for a diesel injection timing signal interceptor module is intended solely for illustrative purposes of a preferred implementation, but is in no way intended to limit the scope of the invention.

As the TRS and SRS circuitry are identical, only one circuit is shown in FIG. 7. Thus, two circuits, each in accordance with the circuit shown in FIG. 7, are utilized in a preferred implementation.

The circuit depicted in FIG. 7 is comprised of four op-amps U1–U4, two capacitors C1 and C2 and fourteen resistors R1–R14. In a preferred implementation, the four op-amps U1–U4 are provided in a single integrated circuit package, such as an industry standard LM324 integrated circuit manufactured by National Semiconductor Corp. of Santa Clara, Calif. Table 2 below sets forth component values in accordance with a specific embodiment of the active filter circuit shown in FIG. 7.

TABLE 2

| Designation | Value or Component |
|---|---|
| R1 | 100Ω |
| R2 | 100K |
| R3 | 100Ω |
| R4 | 100K |
| R5 | 200K |
| R6 | 200K |
| R7 | 200K |
| R8 | 200K |
| R9 | 100Ω |
| R10 | 200K |
| R11 | 200K |
| R12 | 200K |
| R13 | 100Ω |
| R14 | 200K |
| C1 | 0.1 μF |
| C2 | 10 μF |
| U1 | LM324 |
| U2 | LM324 |
| U3 | LM324 |
| U4 | LM324 |

Figure 8:
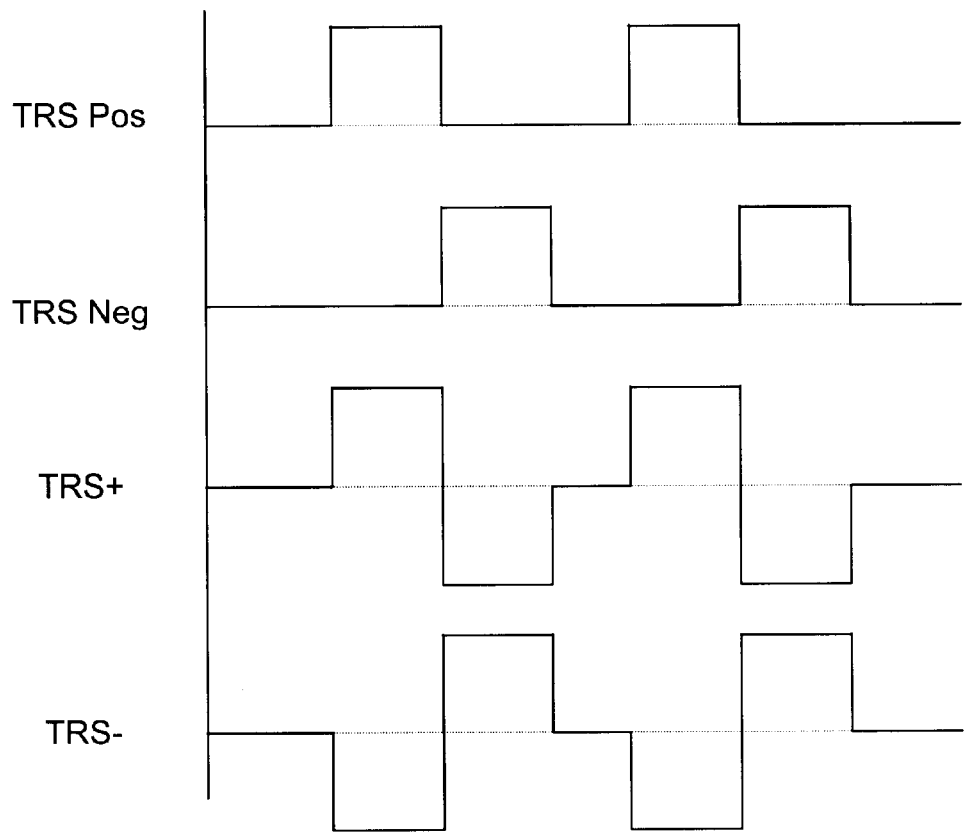
FIG. 8 conceptually depicts pulse trains to (TRS Pos and TRS Neg input) and from (TRS+ and TRS− output) an interface circuit for an interceptor module in accordance with a preferred implementation of the present invention.
Figure 12:
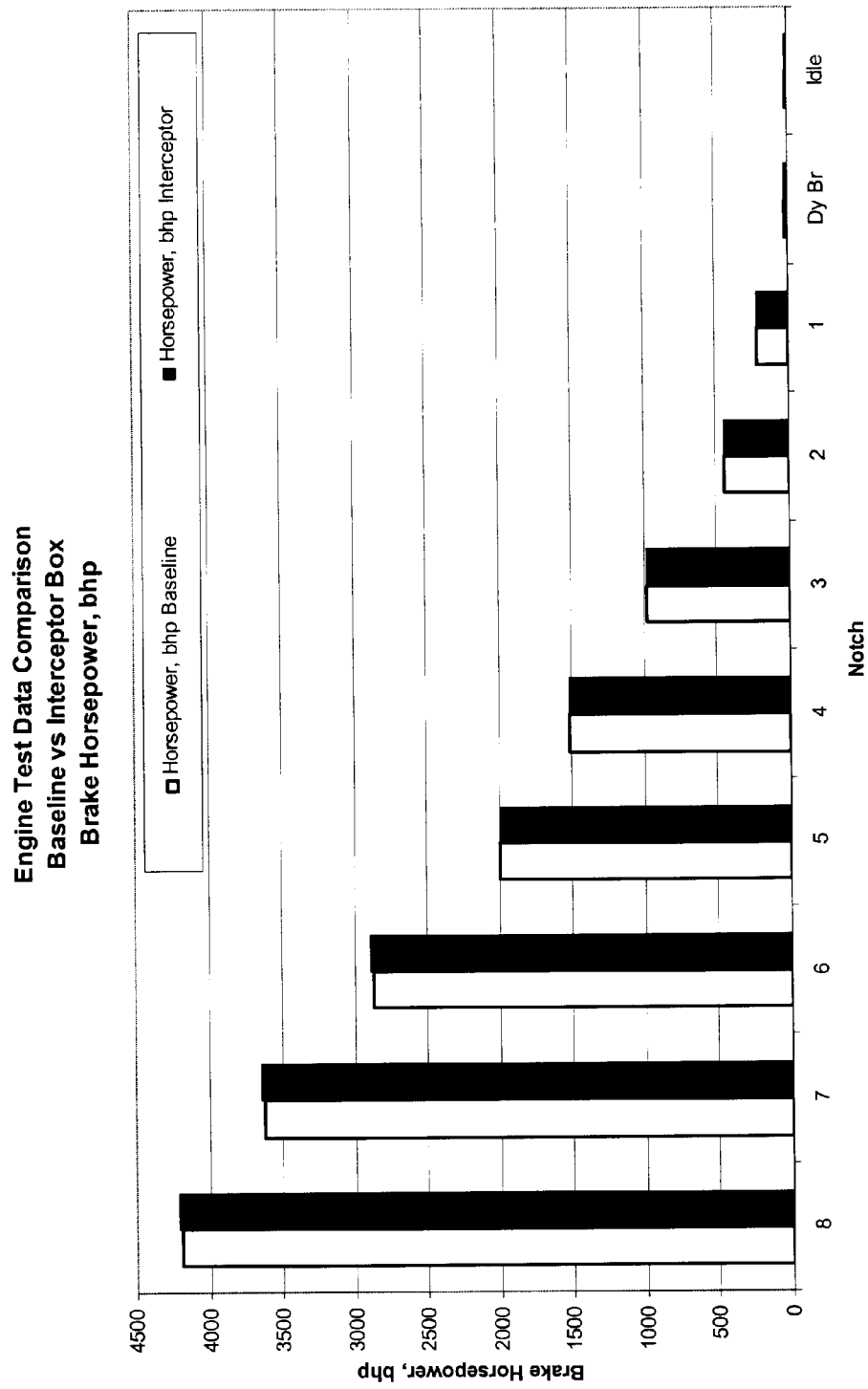
FIG. 12 is a graph showing brake horsepower versus notch settings for a baseline test engine and a test engine having an interceptor module in accordance with a preferred implementation of the present invention.
Figure 13:
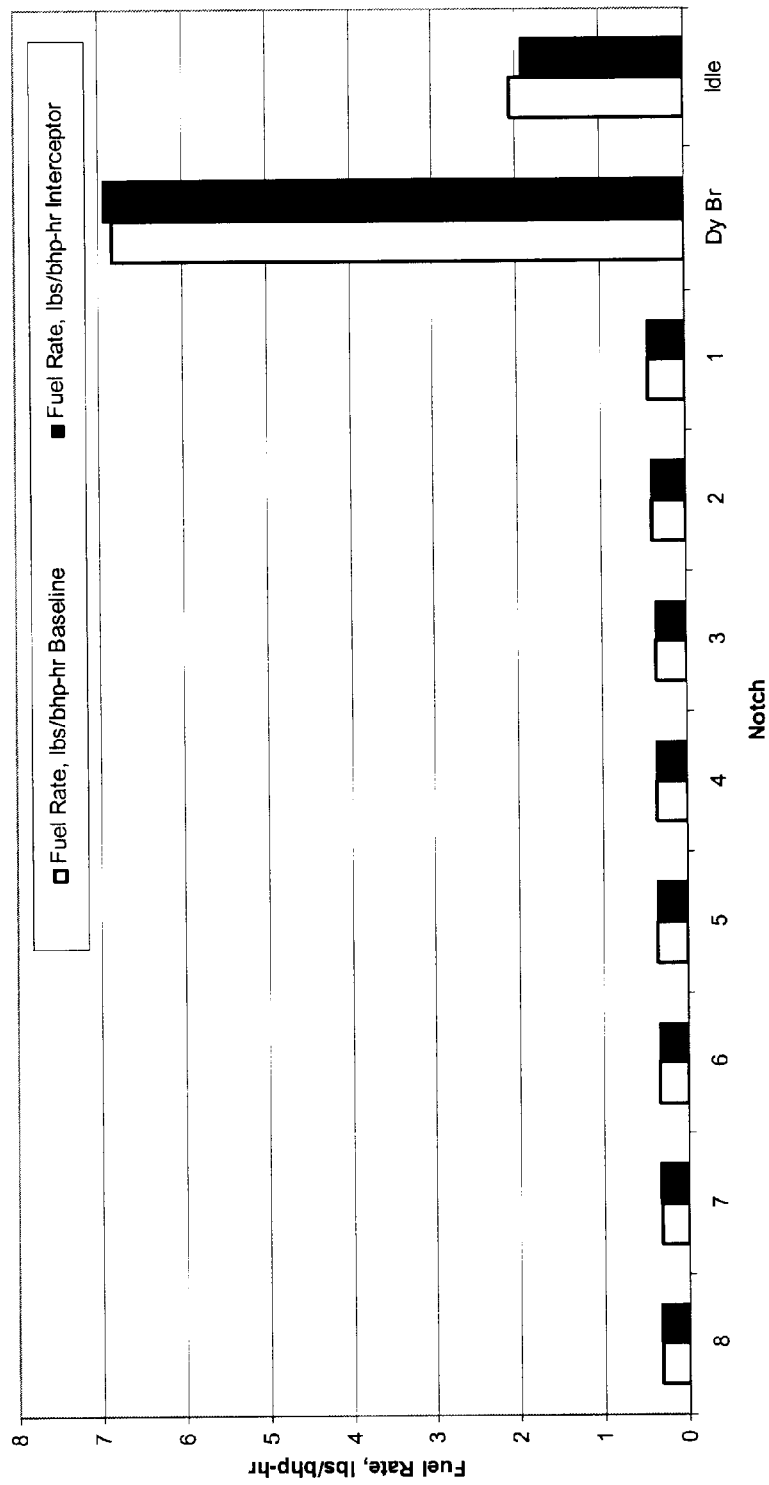
FIG. 13 is a graph showing fuel rate versus notch settings for the baseline test engine and a test engine having an interceptor module in accordance with a preferred implementation of the present invention.
Figure 14:
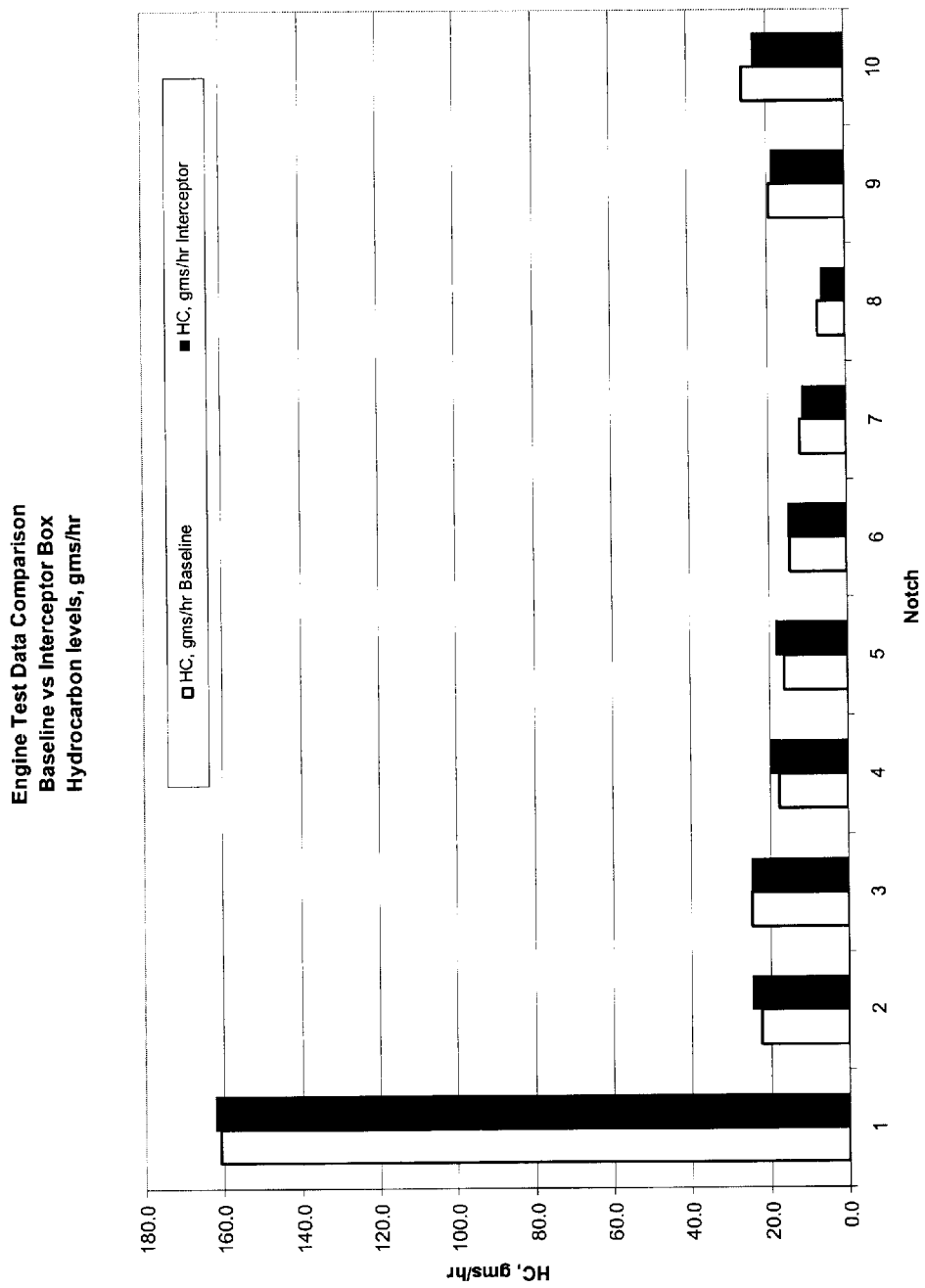
FIG. 14 is a graph showing HC emissions versus notch settings for a baseline test engine and a test engine having an interceptor module in accordance with a preferred implementation of the present invention.
Figure 15:
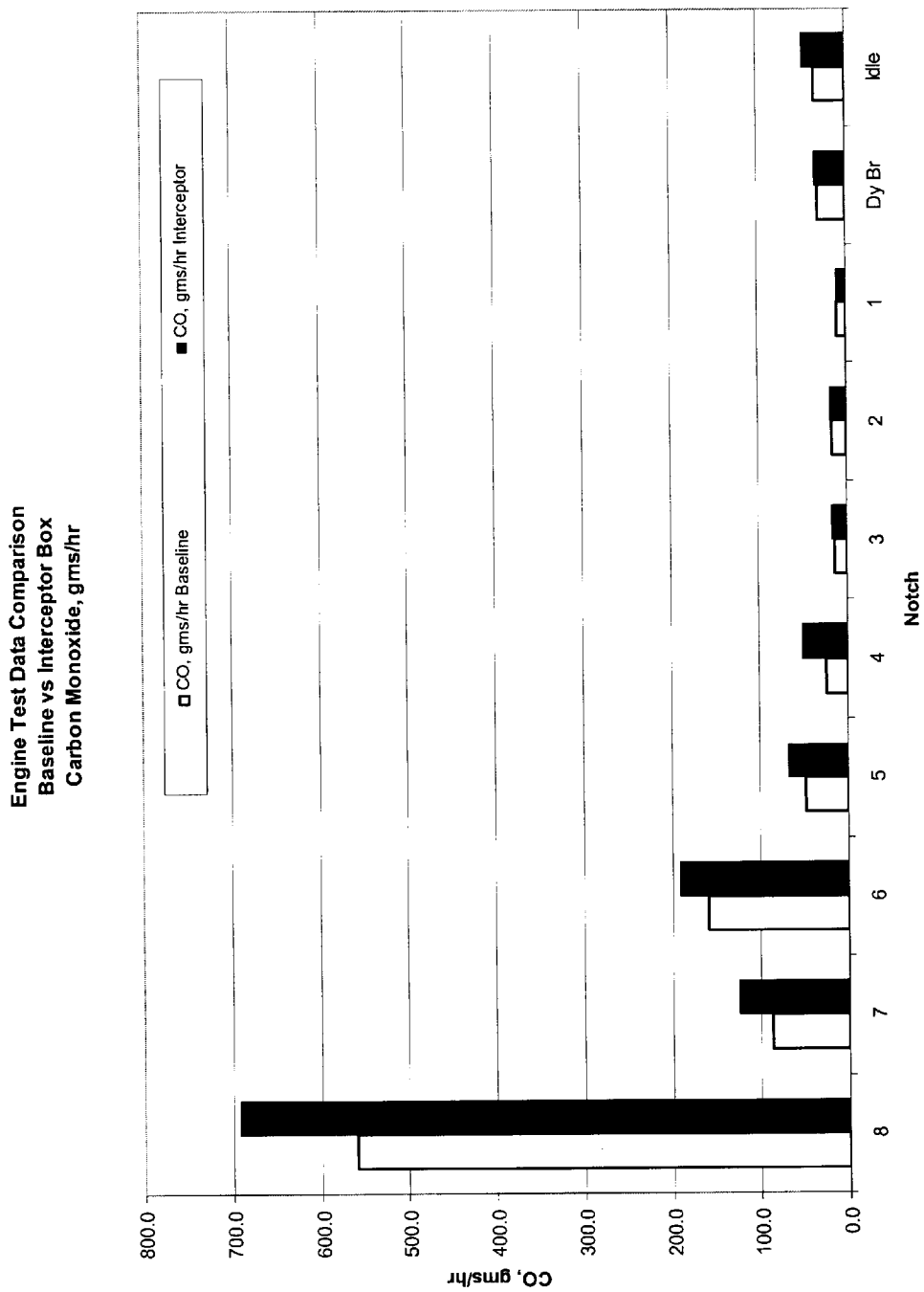
FIG. 15 is a graph showing CO emissions versus notch settings for a baseline test engine and a test engine having an interceptor module in accordance with a preferred implementation of the present invention.
Figure 16:
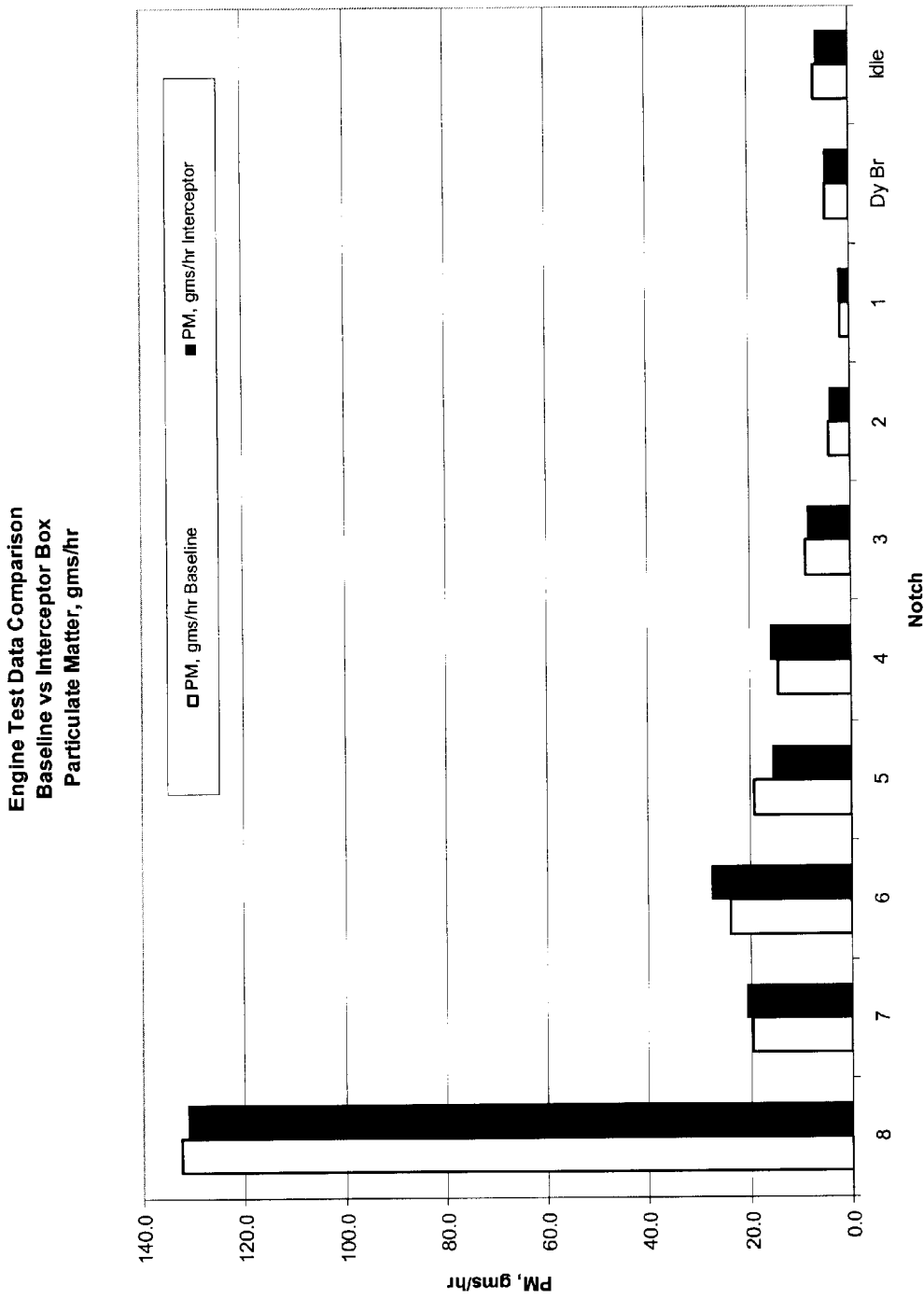
FIG. 16 is a graph showing PM emissions versus notch settings for a baseline test engine and a test engine having an interceptor module in accordance with a preferred implementation of the present invention.
Figure 17:
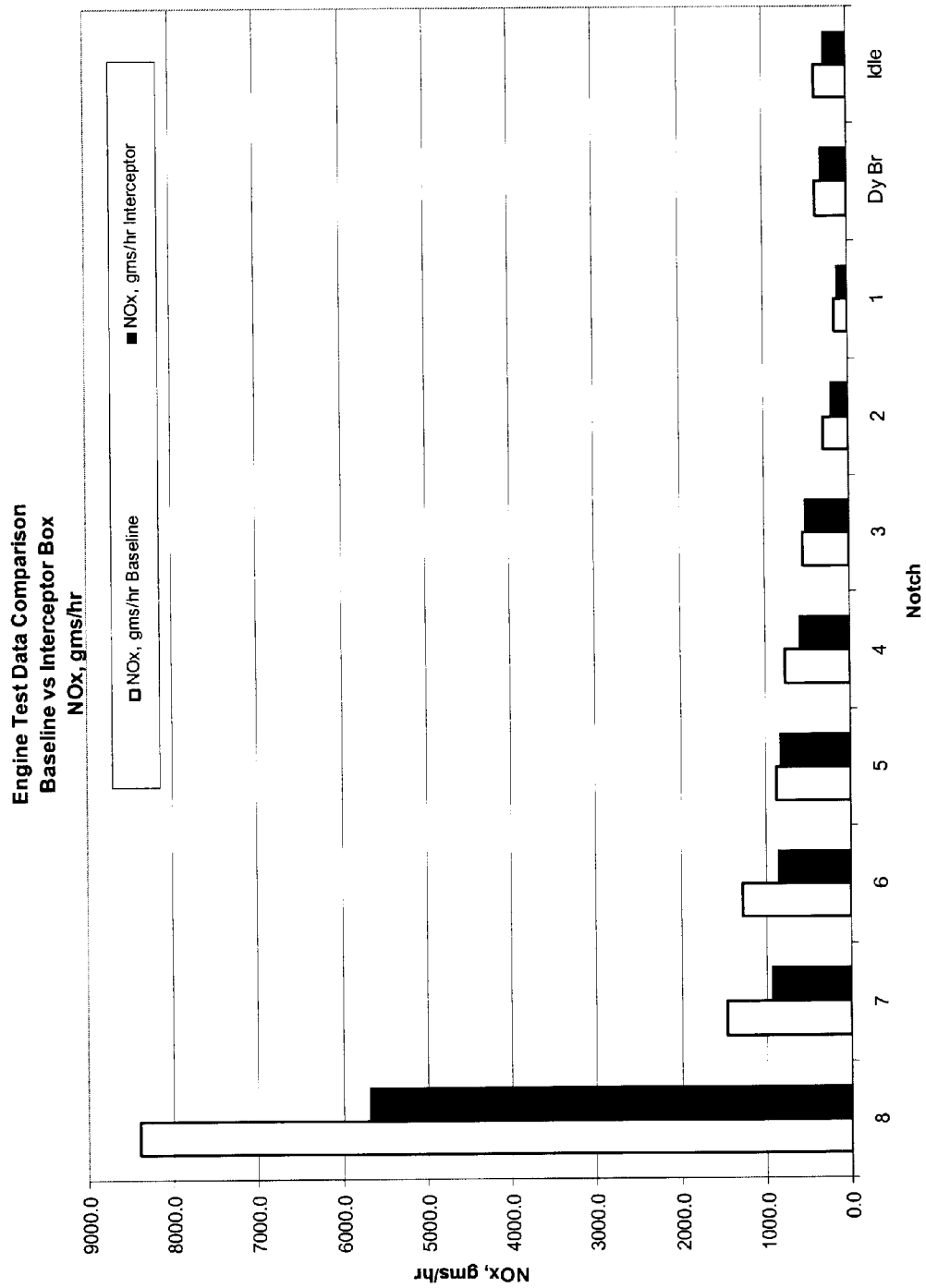
FIG. 17 is a graph showing NOx emissions versus notch settings for a baseline test engine and a test engine having an interceptor module in accordance with a preferred implementation of the present invention.

In an exemplary embodiment, the interface module 185 receives four logic level (0 to 5V) pulse trains comprised of micro-controller signals, referred to as TRS Pos, TRS Neg, SRS Pos and SRS Neg. Output pulse trains from the interface module to the electronic controller are comprised of interface signals and referred to as TRS+, TRS−, SRS+, and SRS−. FIG. 8 shows TRS pulse trains to (TRS Pos and TRS Neg input) and from (TRS+ and TRS− output) an interface circuit for an interceptor module in accordance with a preferred implementation of the present invention, conceptually illustrating the effect of the interface circuit on the input micro-controller signals. The output pulse trains generally mimic TRS and SRS sensor pulse trains and cause the engine's electronic controller to produce desired injection timing signals.

Figure 20:
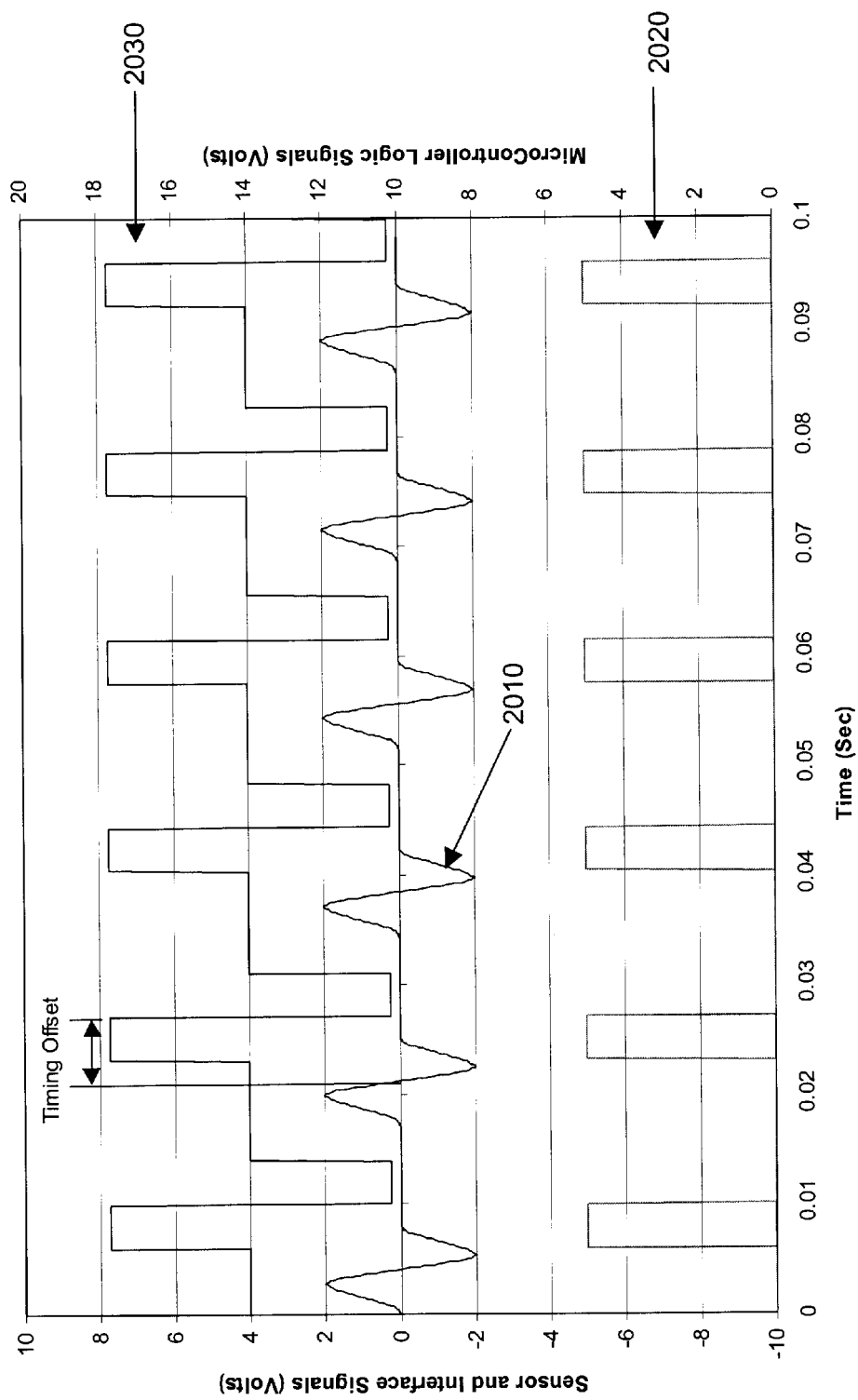
FIG. 20 is a graph that conceptually depicts TRS sensor, micro-controller (TRS Pos) and interface (TRS+) signals versus time in accordance with a preferred implementation of the present invention.
Figure 21:
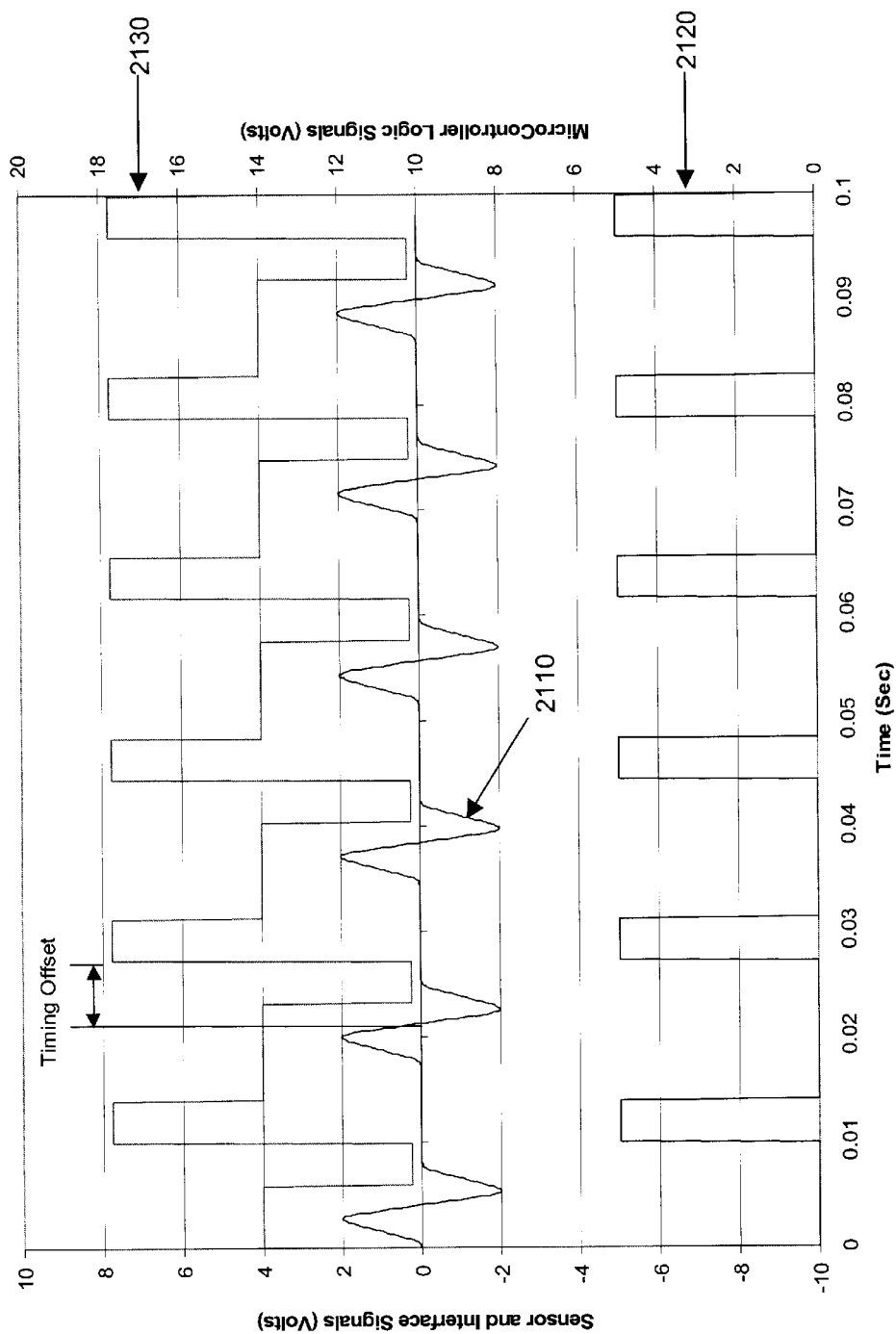
FIG. 21 is a graph that conceptually depicts TRS sensor, micro-controller (TRS Neg) and interface (TRS−) signals versus time in accordance with a preferred implementation of the present invention.
Figure 22:
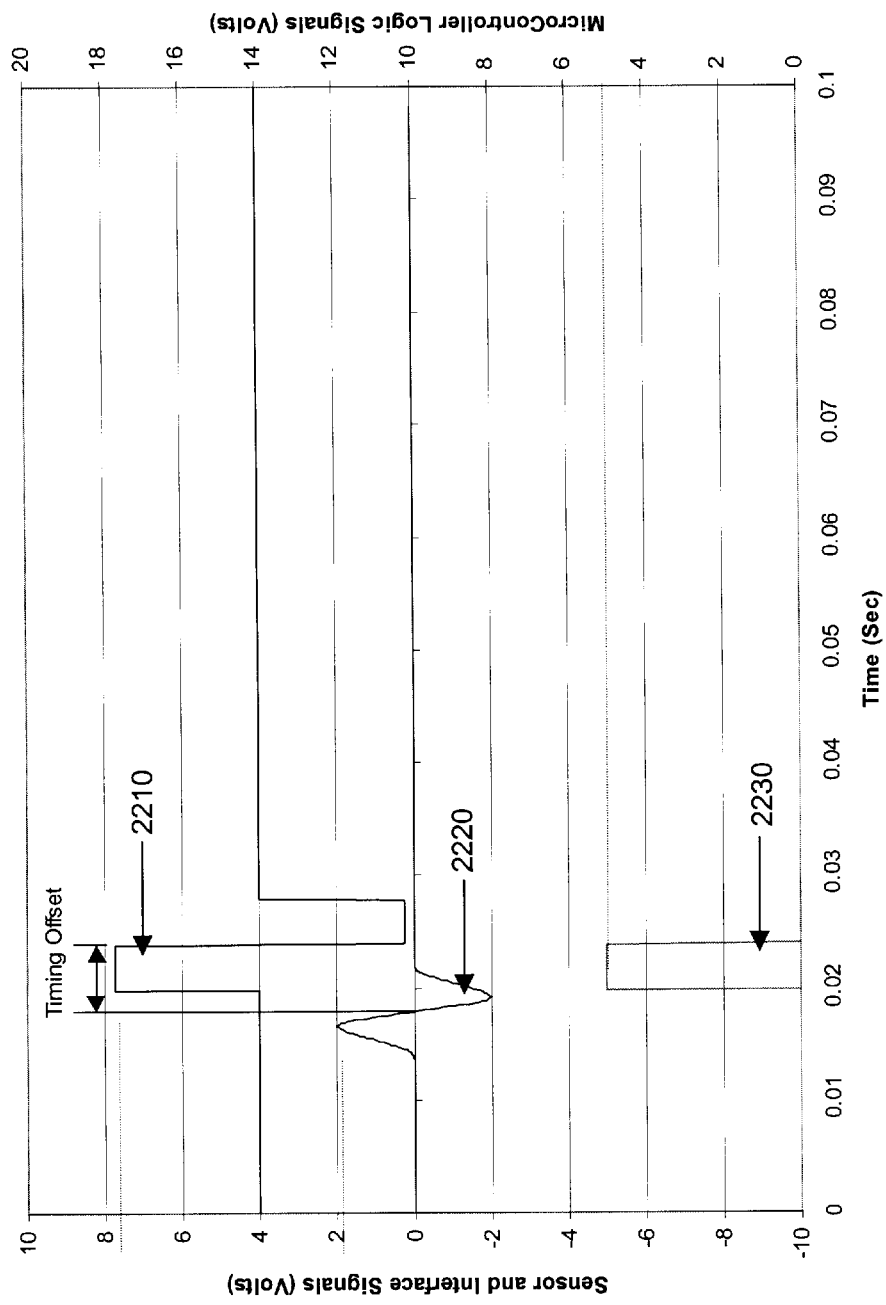
FIG. 22 is a graph that conceptually depicts SRS sensor, micro-controller (SRS Pos) and interface (SRS+) signals versus time in accordance with a preferred implementation of the present invention.
Figure 23:
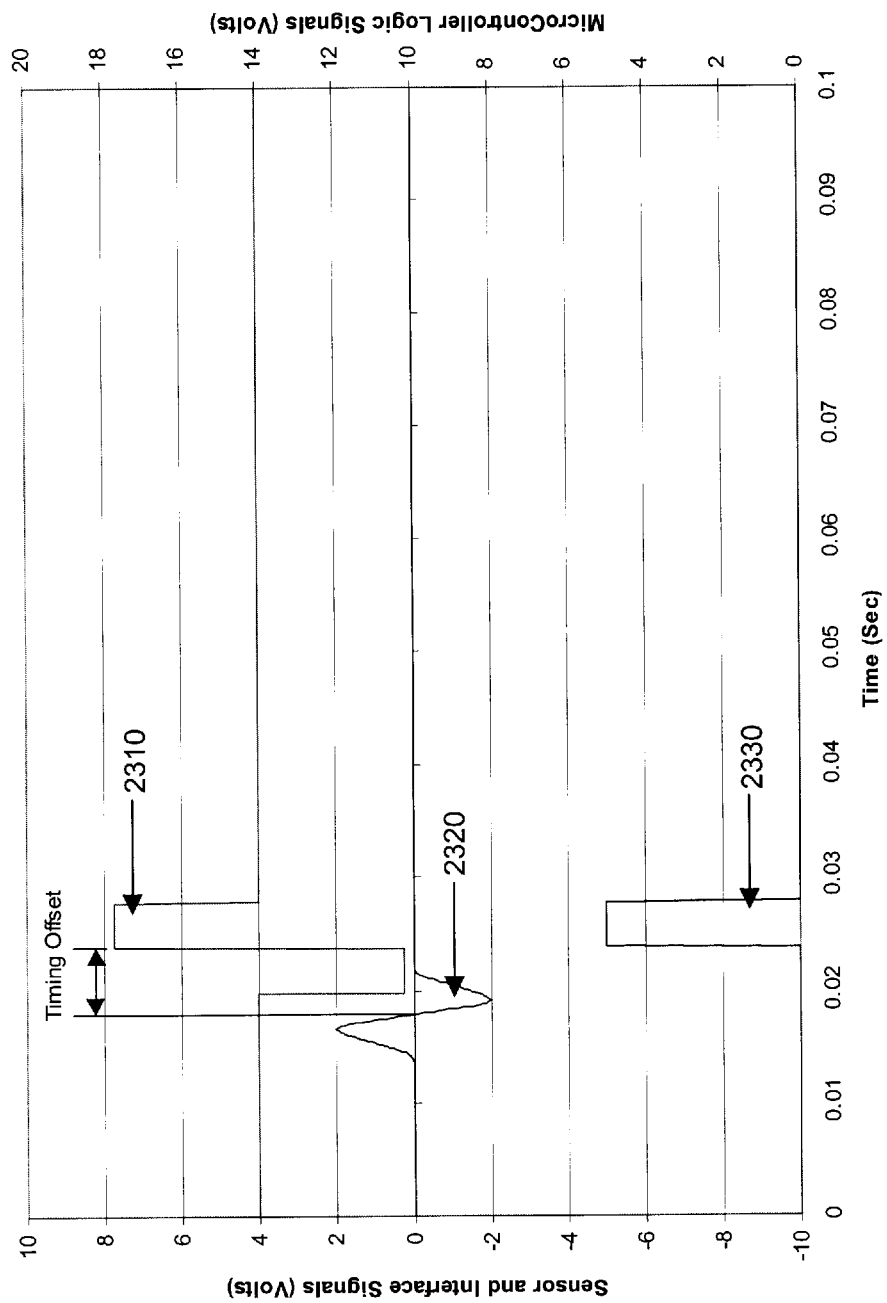
FIG. 23 is a graph that conceptually depicts SRS sensor, micro-controller (SRS Neg) and interface (SRS−) signals versus time in accordance with a preferred implementation of the present invention.

Referring now to FIGS. 20 though 23, graphs are provided to conceptually illustrate signal processing according to an exemplary implementation of the present invention. TRS pulse train 2010 and SRS pulse train 2220 are raw sensor signals. Micro-controller positive (Pos) and negative (Neg) half signals produced according to the methodology described above are shown separately as TRS (Pos) 2020, TRS (Neg) 2120, SRS (Pos) 2230 and SRS (Neg) 2330. Similarly, interface positive (Pos) and negative (Neg) signals produced according to the methodology described above are shown separately as TRS (+) 2030, TRS (−) 2130, SRS (+) 2210 and SRS (−) 2310.

Those skilled in the art will appreciate that a micro-controller module and an interface module in accordance with an exemplary embodiment of the present invention may be separate, as described above, or contained within a single module on a single circuit board. A single module implementation is considered a preferred implementation.

Interface signals may be shifted to advance or delay generation of injection timing signals generated by the electronic controller 160, resulting in advanced or retarded injection timing. To determine suitable relative injection timings, tests were performed using an intercept module in accordance with an exemplary implementation of the present invention as described above. The tests were conducted generally in accordance with the emission test procedures for locomotives as defined in EPA regulations, 40

C.F.R., Part 92, Subpart B (incorporated herein by reference) as of the filing date hereof. The test locomotive was a GM EMD SD70MAC, having a 16 cylinder, two-cycle diesel engine with a displacement of 11.64 liters (710 cu. in.) per cylinder. The locomotive was tested in two configurations—a baseline factory-set configuration without the interceptor module, as in FIG. 1, and a modified configuration employing the interceptor module, as in FIG. 6. Using the intercept module (175 and 185), fuel injection timing for the modified configuration was varied to achieve the relative injection timings shown in the table provided as FIG. 9. Key measurements for each throttle position and relative injection timing include brake-specific emissions (NOx, HC's, CO and PM) expressed in g/BHP-h, engine fuel consumption expressed in lb/BHP-h and horsepower.

In a diesel locomotive, the throttle control has eight positions, each of which is commonly referred to as a "notch", plus an idle position and a dynamic braking (Dy. Br) position. Notch 1 corresponds to the slowest speed and notch 8 corresponds to the highest speed. During dynamic braking, the train's traction motors operate as generators, using the wheels to apply torque to the motors, which slows the train down. Generated electric is dissipated as heat through an electrical resistance grid. While the engine does not generate power for traction motors during dynamic braking, it does generate power to operate cooling fans for a resistance grid.

An objective of the tests was to determine an interceptor module configuration that would result in NOx emission levels safely below Tier 0 EPA limits without unnecessarily compromising fuel economy. For purposes of the tests, a target NOx emission level of 9.2 g/BHP-h was deemed safely below the mandated limit for a line-haul locomotive.

FIGS. 10 and 11 provide tables of test results. FIG. 10 provides results for the baseline configuration, while FIG. 11 provides results for a preferred modified configuration. The first column of each top table refers to throttle (Notch) setting. In FIG. 11, the second column provides relative timing values (i.e., injection timing relative to factory set injection timing), with a positive number representing the number of degrees by which factory-set injection timing is advanced, a negative number representing the number of degrees by which factory-set injection timing is retarded and zero representing original factory-set injection timing. Using an intercept module as described above to produce relative injection timing values set forth in the second column of FIG. 11, the preferred modified configuration resulted in brake specific NOx emissions of approximately 9.35 g/BHP-h, which was considered to be sufficiently close to the target level of 9.2 g/BHP-h and safely below the EPA mandated limit for a line-haul locomotive. The next two columns refer to brake horsepower and fuel consumption in lb/hr. The next four columns provide emissions data (HC's, CO, NOx and PM) expressed in g/hr, respectively.

The remaining columns refer to corrected and weighted results based on data in the foregoing columns. NOx emission rates are adjusted to account for the effects of humidity and temperature in accordance with 40 C.F.R. §92.132(d). The BSFC is a measurement of an engine's efficiency in terms of fuel usage. Specifically, it is the ratio of the rate at which fuel is flowing into the engine to the brake horsepower being generated. The corrected BSFC is the ratio of the observed fuel rate to the brake horsepower corrected to standard conditions according to the Association of American Railroads (AAR), which include ambient air inlet temperature of 60 degrees F, and absolute air pressure at sea level in the plenum chamber on the clean side of the intake air filters of 28.86 inches of Hg, a fuel density, fuel high heating value, (HHV), measured by the chemistry lab analysis of the fuel sample taken during the day for which the engine is being tested, and a fuel temperature of 80 degrees F in the engine's fuel supply header.

FIGS. 10 and 11 also provide separate tables for switcher duty cycle weighted brake-specific emissions, freight duty cycle weighted brake-specific emissions, modal brake-specific emissions and fuel-specific emissions. The switcher duty cycle and freight duty cycle results correspond to use of the test locomotive as a switch locomotive and a line haul locomotive, respectively.

FIGS. 12 through 17 graphically illustrate selected results for brake horsepower, fuel rate, HC emissions, CO emissions, PM emissions and NOx emissions. The results generally show that NOx emissions decrease and fuel consumption increases as ignition timing is slightly retarded from factory setting at a given notch setting. More specifically, the results show an overall 29.3% reduction in brake-specific NOx expressed in g/hp-hr and only a 1.3% increase in brake-specific fuel consumption for a line haul locomotive. For a switcher locomotive, surprisingly, there was no fuel penalty. Instead, fuel consumption decreased by 0.2% and brake specific NOx emissions decreased by 21.4%.

Figure 18:
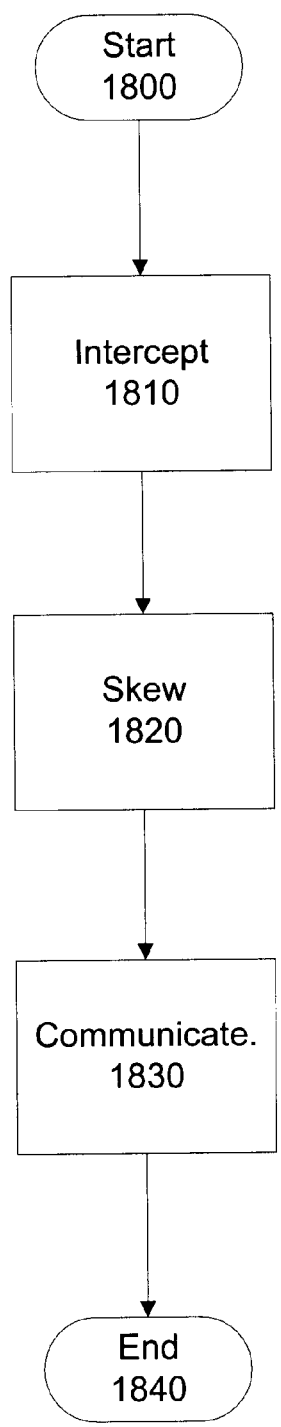
FIG. 18 is a flowchart illustrating an exemplary method for altering injection timing in accordance with a preferred implementation of the present invention.

Referring now to FIG. 18, a flowchart is provided to conceptually illustrate a methodology in accordance with a preferred implementation of the present invention. The first step 1810 is interception. An interceptor module 175 receives sensor signals, such as signals indicative of engine speed and position.

The second step 1820 is shifting. The interceptor module shifts the signals to advance or retard injection timing by a determined amount. To retard injection timing, the interceptor module introduces a time shift that causes a time delay. To advance injection timing, the interceptor module reads sensor signals and produces simulated advanced signals subsequent to the signals read. The amount by which the injection timing is advanced or retarded for a notch setting may be determined by the testing process described above, or by interpolation or extrapolation of test results.

The third step 1830 is communicating the shifted interceptor signals to the electronic controller. This step enables electronic controller 160 to produce injection timing signals based on the shifted interceptor signals rather than the un-shifted original raw sensor signals. Preferably, the shifted interceptor signals cause the electronic controller to produce injection timing signals that achieve emissions and performance in accordance with the user's objectives.

The relative injection timing settings described above and set forth in FIG. 11 are provided for an exemplary implementation of the subject invention. Those skilled in the art will appreciate that an intercept module may be configured and fine-tuned to produce relative injection timings that meet a wide array of emissions and/or performance goals, such as yielding NOx emissions close to a target level, preferably safely below EPA mandated limits, and minimizing fuel consumption at that level. The targets, goals, timings, configurations and settings described above are provided to illustrate a preferred exemplary embodiment. They are not intended to limit the scope of the present invention.

While the invention has been described in terms of its preferred embodiments, those skilled in the art will recognize that the invention can be practiced with modifications within the spirit and scope of the appended claims. Such alternative embodiments and implementations are intended to come within the scope of the present invention.

Having thus described the present invention, what is claimed as new and desired to be secured by letters patent is as follows:

1. An engine injection timing signal interceptor module comprised of a means for receiving at least one sensor signal, a means for producing at least one output signal shifted in time relative to the received at least one sensor signal and a means for communicating the at least one output signal to an electronic controller, said at least one output signal causing the electronic controller to produce an injection timing signal.

2. An engine injection timing signal interceptor module as in claim 1 wherein the means for producing the at least one output signal shifted in time relative to the received at least one sensor signal includes a micro-controller module for determining a time shift and generating at least one micro-controller signal based on the received sensor signal.

3. An engine injection timing signal interceptor module as in claim 2 wherein the means for producing the at least one output signal shifted in time relative to the received at least one sensor signal further includes an interface module for producing the at least one output signal based on the at least one micro-controller signal.

4. An engine injection timing signal interceptor module as in claim 3 wherein the means for producing at least one output signal shifted in time relative to the received at least one sensor signal further includes stored shifting values for defining an amount of shift in time based on the received at least one sensor signal.

5. An engine injection timing signal interceptor module as in claim 4 wherein the at least one sensor signal includes a first signal representative of engine speed and a second signal representative of engine position.

6. An engine injection timing signal interceptor module as in claim 5 wherein the determined shifting values include a plurality of values from the group consisting of a value representative of zero shift, values representative of determined advancements, and values representative of determined delays, each of said determined shifting values corresponding to an engine speed and an engine position.

7. An engine injection timing signal interceptor module as in claim 6 wherein the micro-controller module includes a programmed micro-controller integrated circuit having a capture/compare unit capable of generating multiple pulse trains locked to a time-base.

8. An engine injection timing signal interceptor module as in claim 7 wherein the interface module includes an interface circuit comprised of a plurality of op-amps arranged as an active filter.

9. An engine injection timing signal interceptor module comprised of a means for receiving at least one sensor signal, a micro-controller for determining a time shift and generating at least one micro-controller signal based on the received at least one sensor signal and an interface for producing an output signal based on the at least one micro-controller signal, said microcontroller and said interface being connected to a single circuit board.

10. A method for altering injection timing in an engine having an electronic controller to govern injection timing, said method comprising steps of:

intercepting one or more input signals representing engine speed and engine position, generating one or more output signals representing said one or more input signals shifted in time by a determined offset, communicating said output signals to the electronic controller, the output signals causing the electronic controller to produce determined injection timing signals.

11. A method for altering injection timing as in claim 10 wherein the determined offset equals zero, a positive time shift or a negative time shift.

12. A method for altering injection timing as in claim 11, wherein the step of generating one or more output signals is further comprised of the step of determining the offset from a table based on the one or more input signals.

13. A method for altering injection timing as in claim 12, wherein the step of generating one or more output signals is further comprised of the step of generating a positive simulated half signal based on each of the one or more input signals and a negative simulated half signal based on each of the one or more input signals, each of said output signals being a combination of said positive simulated half signal and said negative simulated half signal.

14. A method for altering injection timing as in claim 13, wherein the input signals include a TRS sensor pulse train and an SRS sensor pulse train, and the step of generating a positive simulated half signal based on each of the one or more input signals and a negative simulated half signal based on each of the one or more input signals is further comprised of the steps of:

generating a TRS Pos pulse train and a TRS Neg pulse train based on the TRS sensor pulse train, pulses of said TRS Pos pulse train and said TRS Neg pulse train being shifted by the determined offset, and generating an SRS Pos pulse train and an SRS Neg pulse train based on the SRS sensor pulse train, pulses of said SRS Pos pulse train and said SRS Neg pulse train being shifted by the determined offset, and generating a TRS+ pulse train and a TRS− pulse train based on the TRS Pos pulse train and the TRS Neg pulse train, and generating an SRS+ pulse train and a SRS− pulse train based on the SRS Pos pulse train and the SRS Neg pulse train.

15. A method for altering injection timing as in claim 10, wherein the determined injection timing signals produced by the engine controller cause a reduction in NOx emissions as compared to NOx emissions attributable to said one or more input signals.

16. A method for altering injection timing as in claim 15, wherein the determined injection timing signals produced by the engine controller cause an increase in fuel consumption below a determined acceptable limit for said increase.

* * * * *